US012597986B2

(12) United States Patent (10) Patent No.: US 12,597,986 B2
Dasala et al. (45) Date of Patent: Apr. 7, 2026

(54) PASSIVE OR SEMI-PASSIVE DEVICE WITH POLARIZATION CONVERSION CAPABILITY

(71) Applicant: QUALCOMM Incorporated, San Diego, CA (US)

(72) Inventors: Keerthi Priya Dasala, Bridgewater Township, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 18/500,977

(22) Filed: Nov. 2, 2023

(65) Prior Publication Data

US 2025/0150154 A1 May 8, 2025

(51) Int. Cl.
H04B 7/145 (2006.01)
H04B 7/22 (2006.01)
(52) U.S. Cl.
CPC .............. H04B 7/145 (2013.01); H04B 7/22 (2013.01)
(58) Field of Classification Search
None
See application file for complete search history.

(56) References Cited

U.S. PATENT DOCUMENTS 5,164,985 A * 11/1992 Nysen .................... H04B 7/002
342/60
5,963,276 A * 10/1999 Inbar .................... G02B 27/026
382/128

6,309,074 B1 * 10/2001 Inbar .................... G02B 27/026
353/74
6,396,575 B1 * 5/2002 Holland ............. G01M 11/3181
356/73.1
6,970,089 B2 * 11/2005 Carrender ........... G06K 7/0008
340/572.7

(Continued)

FOREIGN PATENT DOCUMENTS

CN 1037812 A * 12/1989
CN 1038002 A * 12/1989 ............ H03M 1/305

(Continued)

OTHER PUBLICATIONS

Mazaheri et al, mmTag—A Millimeter Wave Backscatter Network, Sigcomm Aug. 2021 (Year: 2021).*

(Continued)

*Primary Examiner* — Berhanu Tadese
(74) *Attorney, Agent, or Firm* — Procopio, Cory, Hargreaves & Savitch

(57) ABSTRACT

Method and apparatus for passive or semi-passive nodes having polarization conversion capability. The apparatus provides, to a passive node or a semi-passive node, an access control indication that indicates support for at least one of a first mode of operation or a second mode of operation. The apparatus monitors for a backscattered signal from the passive node or the semi-passive node that is supported by the access control indication, where the backscattered signal comprises the first mode of operation. The apparatus communicates with the passive node or the semi-passive node in response to the first mode of operation of the backscattered signal actively supported by the access control indication.

30 Claims, 15 Drawing Sheets

(56) References Cited

U.S. PATENT DOCUMENTS

| | | | | |
|---|---|---|---|---|
| 7,106,448 | B1 * | 9/2006 | Vawter | G02B 6/12004 |
| | | | | 385/12 |
| 7,460,248 | B2 * | 12/2008 | Kurtz | G01N 21/6458 |
| | | | | 356/497 |
| 9,130,671 | B2 * | 9/2015 | Lee | H04B 10/071 |
| 12,072,441 | B2 * | 8/2024 | Fonseca-Dias | |
| | | | | G06K 19/07786 |
| 12,137,412 | B2 * | 11/2024 | Wang | H04B 7/26 |
| 2008/0131133 | A1 * | 6/2008 | Blunt | G01S 13/758 |
| | | | | 398/128 |
| 2008/0180254 | A1 * | 7/2008 | Kajander | H01Q 1/2208 |
| | | | | 340/572.7 |
| 2010/0158522 | A1 * | 6/2010 | Cho | H04J 14/0282 |
| | | | | 398/115 |
| 2023/0327709 | A1 * | 10/2023 | Wang | H04W 60/04 |
| | | | | 455/41.1 |
| 2024/0088957 | A1 * | 3/2024 | Wang | G06K 19/0723 |
| 2024/0089725 | A1 * | 3/2024 | Wang | G01S 7/006 |
| 2024/0107447 | A1 * | 3/2024 | Wang | H02J 50/80 |
| 2024/0175963 | A1 * | 5/2024 | Fahim | H04W 4/029 |
| 2024/0421856 | A1 * | 12/2024 | Patchava | H04B 5/77 |
| 2024/0427005 | A1 * | 12/2024 | Fahim | G01S 13/74 |
| 2024/0430813 | A1 | 12/2024 | Hu | |
| 2025/0038841 | A1 * | 1/2025 | Gupta | H04L 5/0094 |
| 2025/0150154 | A1 * | 5/2025 | Dasala | H04B 7/145 |

FOREIGN PATENT DOCUMENTS

| | | | | | |
|---|---|---|---|---|---|
| CN | 1028944 | C | * | 6/1995 | |
| CN | 102519713 | A | * | 6/2012 | |
| CN | 102880885 | A | * | 1/2013 | |
| CN | 102880885 | B | * | 9/2015 | |
| CN | 110532662 | A | * | 12/2019 | G06N 20/10 |
| CN | 111983575 | A | * | 11/2020 | G01S 7/024 |
| CN | 116773618 | A | * | 9/2023 | |
| CN | 118985099 | A | * | 11/2024 | H04B 5/77 |
| CN | 119256517 | A | * | 1/2025 | H04W 24/08 |
| CN | 119487521 | A | * | 2/2025 | H04W 72/25 |
| CN | 119547077 | A | * | 2/2025 | G06K 7/10118 |
| CN | 119790603 | A | * | 4/2025 | H04B 7/0628 |
| CN | 119856417 | A | * | 4/2025 | H04W 48/16 |
| EP | 0328836 | A2 | * | 8/1989 | H04B 1/54 |
| EP | 0328836 | B1 | * | 1/1996 | H04B 7/002 |
| EP | 1505749 | A1 | * | 2/2005 | G01M 11/331 |
| EP | 1520251 | B1 | * | 7/2009 | G06K 19/0723 |
| EP | 4184125 | A1 | * | 5/2023 | G01S 7/415 |
| EP | 4357969 | A1 | * | 4/2024 | G06K 19/077 |
| EP | 4358421 | A1 | * | 4/2024 | H04B 7/10 |
| EP | 4184125 | B1 | * | 5/2024 | G01D 21/00 |
| EP | 4492697 | A1 | * | 1/2025 | H04B 5/24 |
| WO | WO-8904093 | A1 | * | 5/1989 | G01S 13/825 |
| WO | WO-9701127 | A2 | * | 1/1997 | G02B 27/026 |
| WO | WO-2004006177 | A1 | * | 1/2004 | G06K 7/0008 |
| WO | WO-2007029962 | A1 | * | 3/2007 | H04J 14/0305 |
| WO | WO-2023168605 | A1 | * | 9/2023 | H04B 5/24 |
| WO | WO-2023201153 | A1 | * | 10/2023 | H04L 5/14 |
| WO | WO-2023221074 | A1 | * | 11/2023 | H04W 48/20 |
| WO | WO-2023225929 | A1 | * | 11/2023 | H04W 24/08 |
| WO | WO-2024011499 | A1 | * | 1/2024 | G06K 19/071 |
| WO | WO-2024016197 | A1 | * | 1/2024 | G06K 7/10128 |
| WO | WO-2024036591 | A1 | * | 2/2024 | H04W 52/0248 |
| WO | WO-2024059413 | A1 | * | 3/2024 | H04B 7/10 |
| WO | WO-2024059419 | A1 | * | 3/2024 | H04B 7/0617 |
| WO | WO-2024063972 | A1 | * | 3/2024 | H02J 50/001 |
| WO | WO-2024082205 | A1 | * | 4/2024 | H04W 52/0219 |
| WO | WO-2024113349 | A1 | * | 6/2024 | H04L 5/04 |
| WO | WO-2024130529 | A1 | * | 6/2024 | H04W 4/80 |
| WO | WO-2024130585 | A1 | * | 6/2024 | H02J 50/001 |
| WO | WO-2024152236 | A1 | * | 7/2024 | H04L 27/12 |
| WO | WO-2024156078 | A1 | * | 8/2024 | H04W 36/0094 |
| WO | WO-2024174216 | A1 | * | 8/2024 | H02J 50/80 |
| WO | WO-2024182991 | A1 | * | 9/2024 | H02J 50/40 |
| WO | WO-2024205793 | A1 | * | 10/2024 | H04B 7/06958 |
| WO | WO-2024258494 | A1 | * | 12/2024 | H04B 5/79 |
| WO | WO-2024263331 | A1 | * | 12/2024 | H04W 64/00 |
| WO | WO-2025014638 | A1 | * | 1/2025 | H04W 72/1273 |
| WO | WO-2025043432 | A1 | * | 3/2025 | H04B 7/22 |
| WO | WO-2025054806 | A1 | * | 3/2025 | G01S 13/765 |

OTHER PUBLICATIONS

Mazaheri, M.H., et al., "MMTag: A Millimeter Wave Backscatter Network", Proceedings of the ACM SIGCOMM 2021, Aug. 2021, pp. 463-474.

Soltanaghaei E., et al., "Millimetro: MMWave Retro-Reflective Tags for Accurate, Long Range Localization", Proceedings of the MobiCom 2021, Oct. 2021, pp. 69-82.

International Search Report and Written Opinion—PCT/US2024/052828—ISA/EPO—Apr. 11, 2025.

Partial International Search Report—PCT/US2024/052828—ISA/EPO—Feb. 21, 2025.

* cited by examiner

500

510

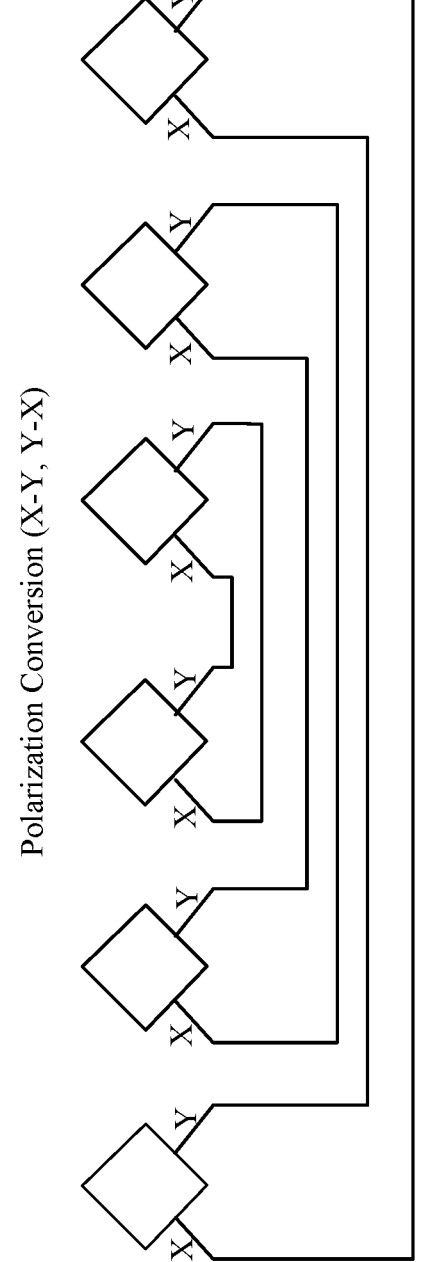
Polarization Conversion (X-Y, Y-X)
FIG. 8A
800
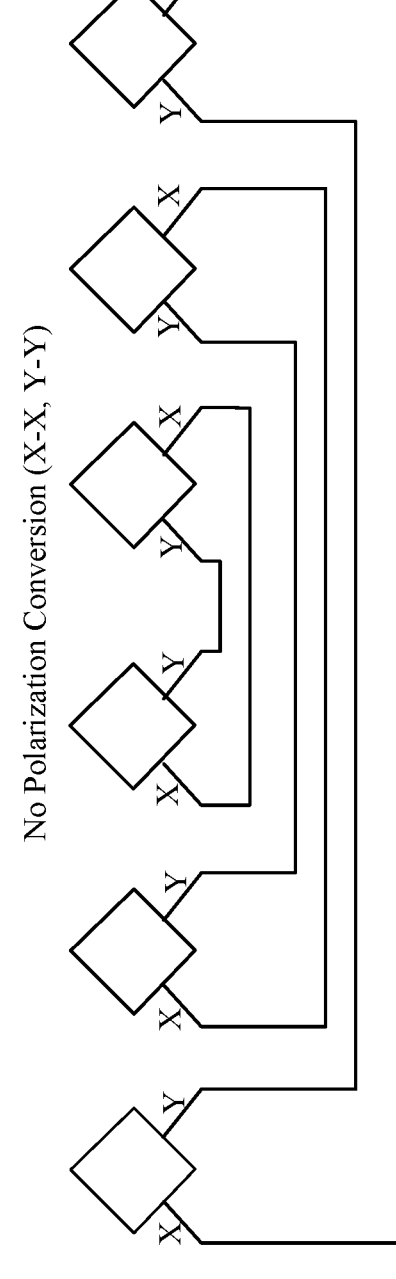
No Polarization Conversion (X-X, Y-Y)
FIG. 8B
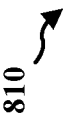
810

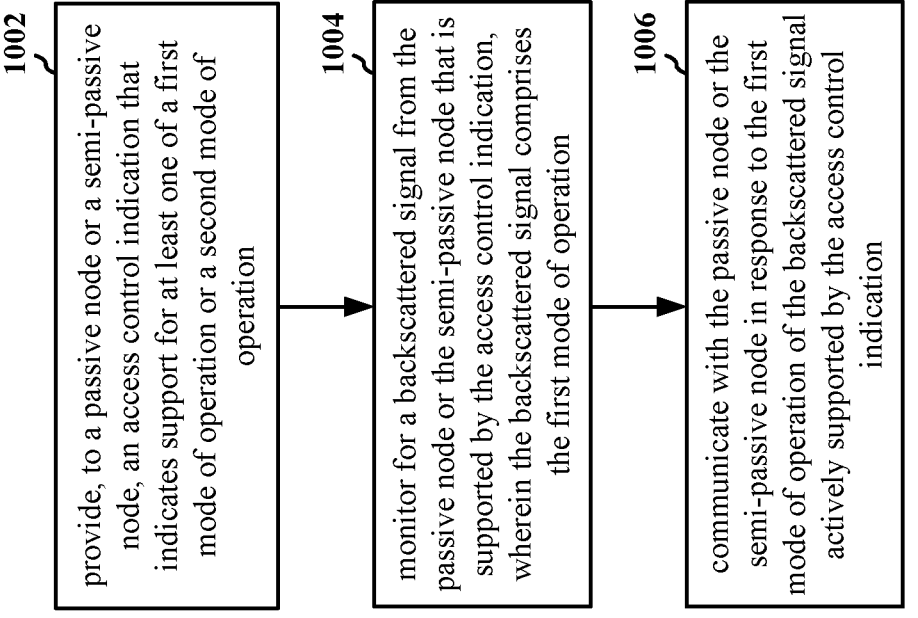

1002 provide, to a passive node or a semi-passive node, an access control indication that indicates support for at least one of a first mode of operation or a second mode of operation

1004 monitor for a backscattered signal from the passive node or the semi-passive node that is supported by the access control indication, wherein the backscattered signal comprises the first mode of operation

1006 communicate with the passive node or the semi-passive node in response to the first mode of operation of the backscattered signal actively supported by the access control indication

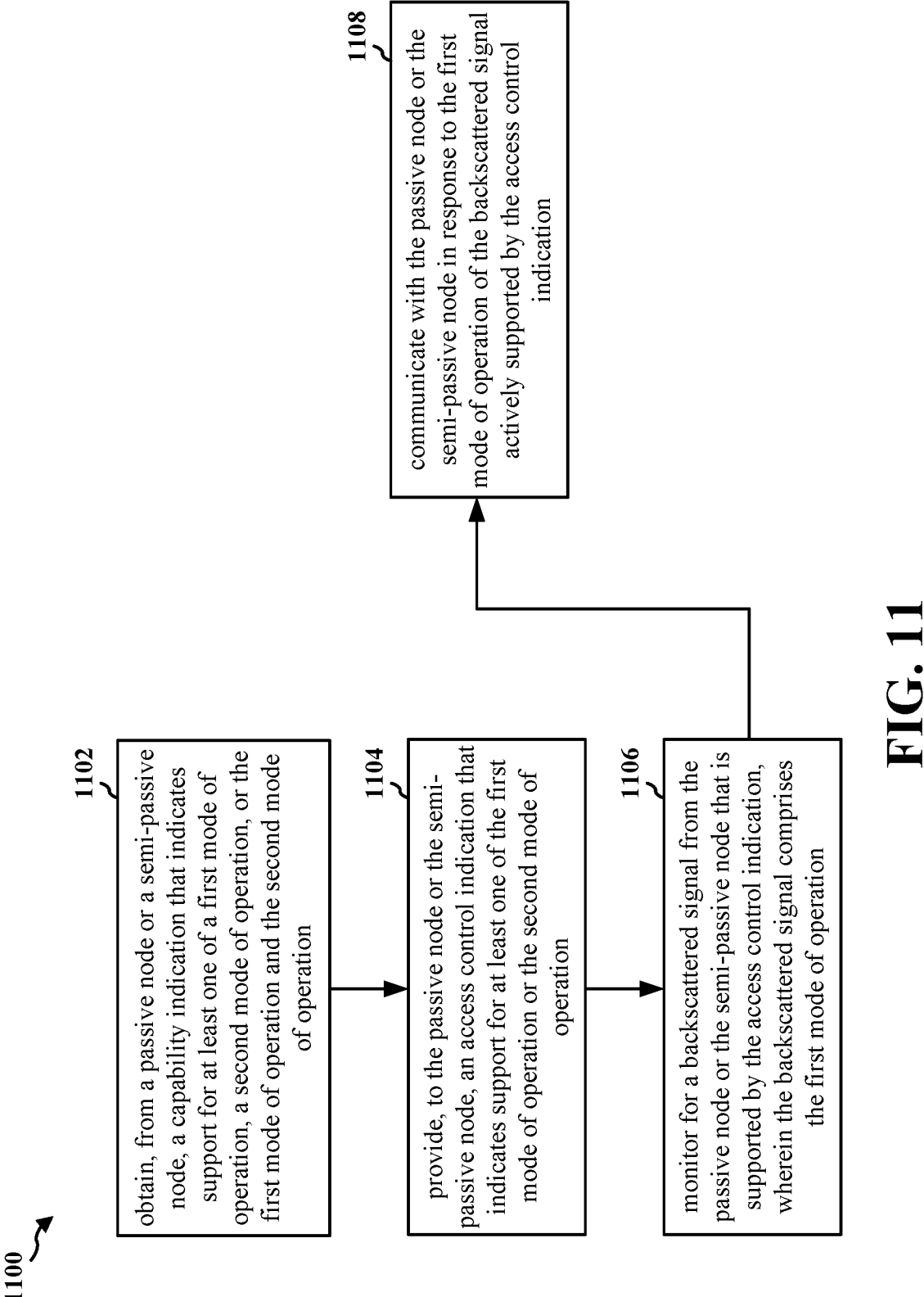

1100

1102 obtain, from a passive node or a semi-passive node, a capability indication that indicates support for at least one of a first mode of operation, a second mode of operation, or the first mode of operation and the second mode of operation 1104 provide, to the passive node or the semi-passive node, an access control indication that indicates support for at least one of the first mode of operation or the second mode of operation 1106 monitor for a backscattered signal from the passive node or the semi-passive node that is supported by the access control indication, wherein the backscattered signal comprises the first mode of operation 1108 communicate with the passive node or the semi-passive node in response to the first mode of operation of the backscattered signal actively supported by the access control indication

FIG. 11

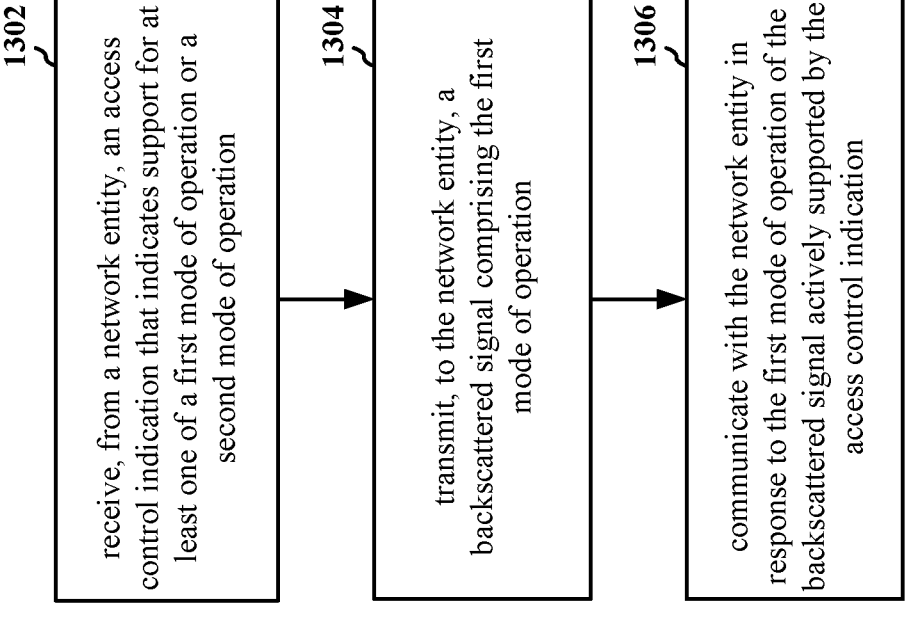

1302 receive, from a network entity, an access control indication that indicates support for at least one of a first mode of operation or a second mode of operation

1304 transmit, to the network entity, a backscattered signal comprising the first mode of operation

1306 communicate with the network entity in response to the first mode of operation of the backscattered signal actively supported by the access control indication

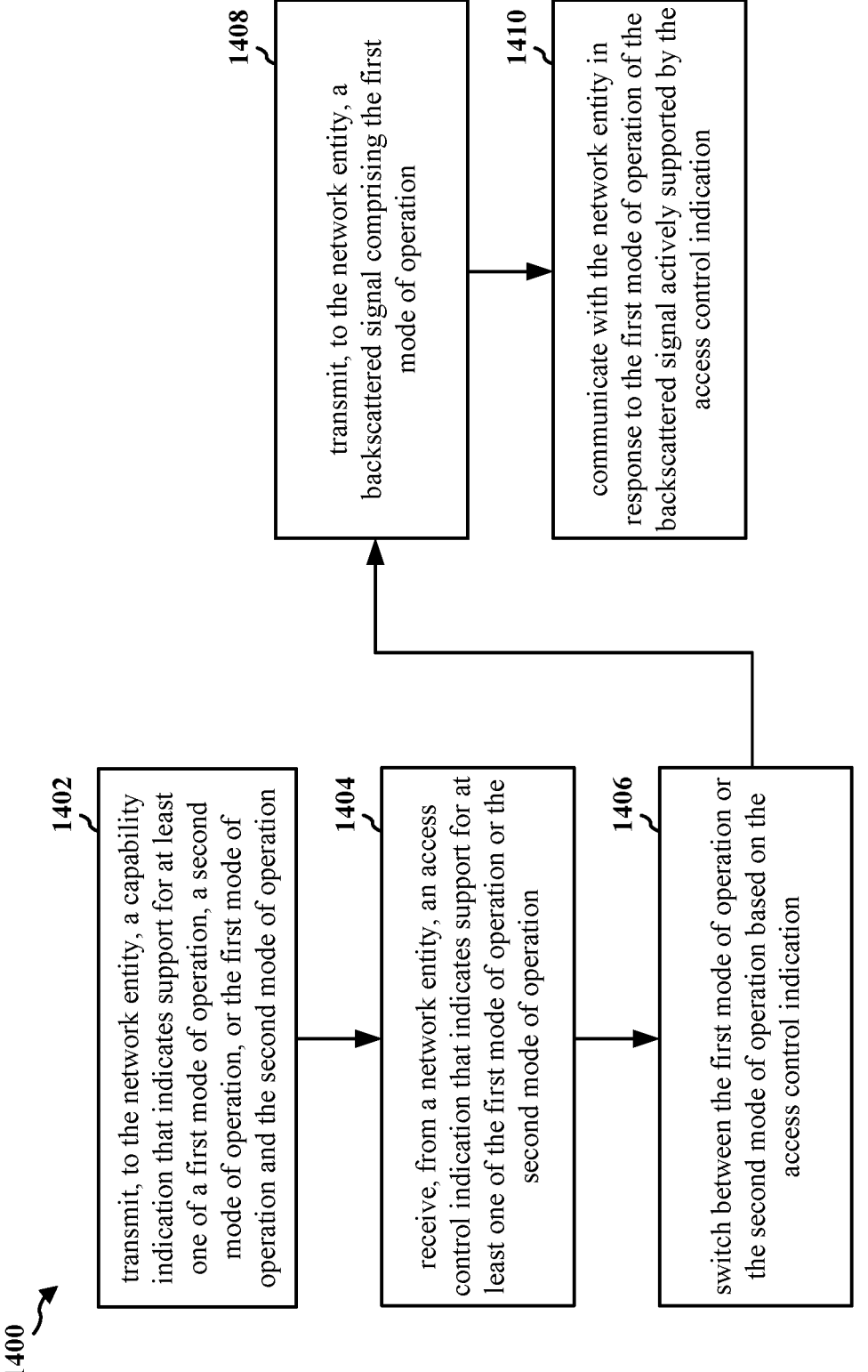

1402 transmit, to the network entity, a capability indication that indicates support for at least one of a first mode of operation, a second mode of operation, or the first mode of operation and the second mode of operation

1404 receive, from a network entity, an access control indication that indicates support for at least one of the first mode of operation or the second mode of operation

1406 switch between the first mode of operation or the second mode of operation based on the access control indication

1408 transmit, to the network entity, a backscattered signal comprising the first mode of operation

1410 communicate with the network entity in response to the first mode of operation of the backscattered signal actively supported by the access control indication

PASSIVE OR SEMI-PASSIVE DEVICE WITH POLARIZATION CONVERSION CAPABILITY

TECHNICAL FIELD

The present disclosure relates generally to communication systems, and more particularly, to a configuration for passive or semi-passive devices with polarization conversion capabilities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a network entity. The device may be a processor and/or a modem at a network node or the network node itself. The apparatus provides, to a passive node or a semi-passive node, an access control indication that indicates support for at least one of a first mode of operation or a second mode of operation. The apparatus monitors for a backscattered signal from the passive node or the semi-passive node that is supported by the access control indication, wherein the backscattered signal comprises the first mode of operation. The apparatus communicates with the passive node or the semi-passive node in response to the first mode of operation of the backscattered signal actively supported by the access control indication.

In an aspect of the disclosure, a method, a computer-readable medium, and an apparatus are provided for wireless communication at a passive or semi-passive node. The apparatus receives, from a network entity, an access control indication that indicates support for at least one of a first mode of operation or a second mode of operation. The apparatus transmits, to the network entity, a backscattered signal comprising the first mode of operation. The apparatus communicates with the network entity in response to the first mode of operation of the backscattered signal actively supported by the access control indication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is a diagram illustrating an example of an array for polarization conversion.

FIG. 8B is a diagram illustrating an example of an array without polarization conversion.

FIG. 10 is a flowchart of a method of wireless communication.

FIG. 11 is a flowchart of a method of wireless communication.

FIG. 13 is a flowchart of a method of wireless communication.

FIG. 14 is a flowchart of a method of wireless communication.

DETAILED DESCRIPTION

Figure 1:
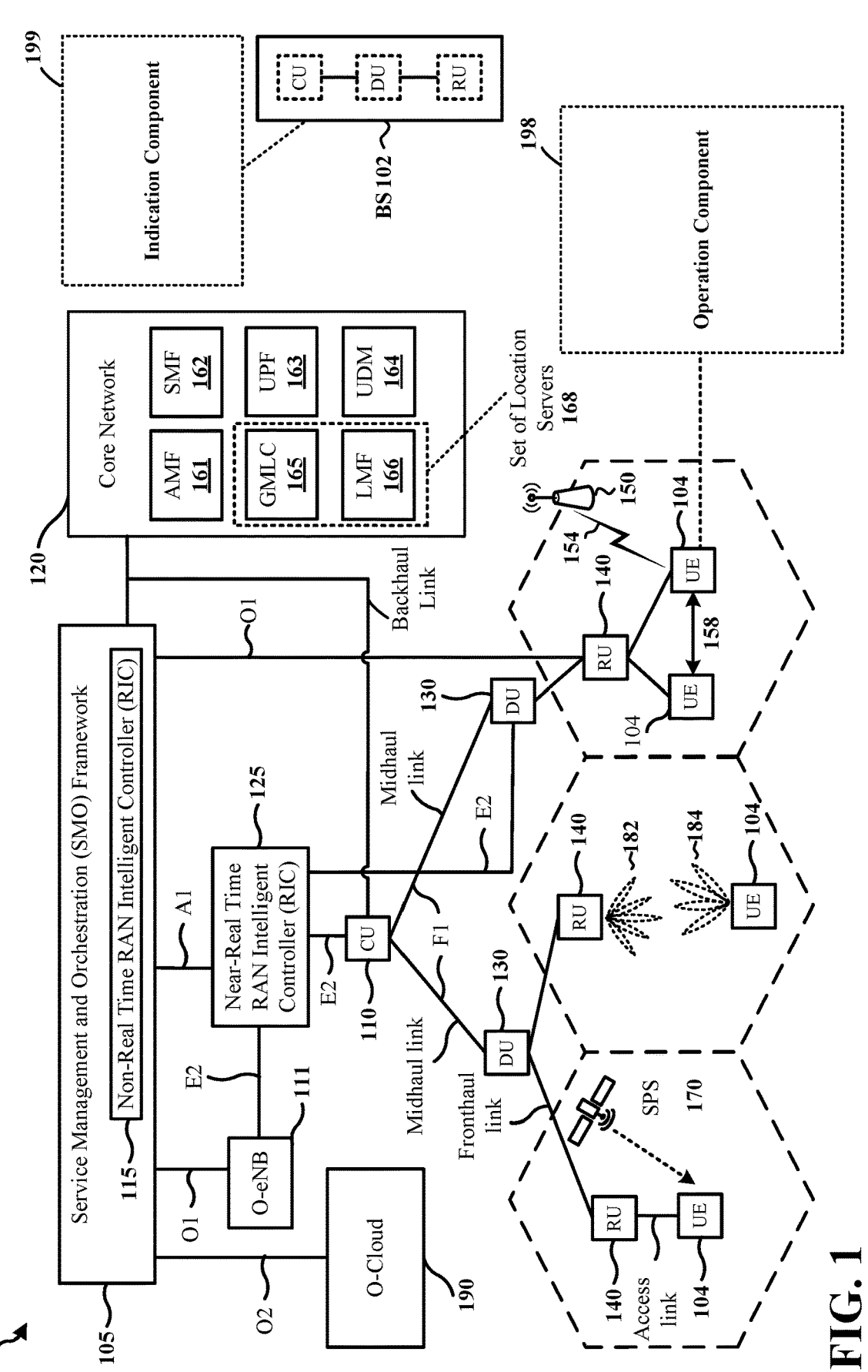
FIG. 1 is a diagram illustrating an example of a wireless communications system and an access network.

A wireless communication system may include one or more devices that harvest or acquire energy from a wireless signal and use the harvested energy for wireless communication, sensing, or other operations of the device. In some aspects, the device may be referred to as a passive device, a semi-passive device, an energy harvesting device, a tag, a backscatter device, or a UE, among other examples. In some aspects, the device may include an energy harvesting modality (e.g., a backscatter radio). Backscattering technology offers very low-power wireless communication by enabling such devices to piggyback their data on the RF signals of other devices, instead of generating and transmitting their own signals, which may eliminate the need for an active transmitter and power-hungry RF components and enabling backscatter devices to communicate on a very low energy budget. In some aspects, the passive device may backscatter a signal that is received by a reader. The reader may correspond to a UE, or a network node, such as a base station or other device. In some aspects, the reader may transmit the initial signal that causes the passive device to backscatter the signal to the reader. In other aspects, the initial signal may be transmitted by a different device than the reader.

Aspects presented herein provide a configuration for passive or semi-passive device with polarization conversion capabilities. For example, to support backscattering with polarization conversion, both the passive or semi-passive device (e.g., tag) and the reader should support polarization conversion and coordinate with each other to implement polarization conversion. Aspects presented herein provide signaling or coordination between devices to identify supported modes of operation (e.g., with and without polarization conversion) and/or to coordinate switching between different modes of operation. The polarization conversion may help to reduce interference, e.g., such as self-interference at a monostatic reader. The signaling provided herein enables coordination between devices to enable interference mitigation while maintaining consistent polarization settings between the devices.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., as an example of a passive device or semi-passive device) may comprise an operation component 198 that may be configured to receive, from a network entity, an access control indication that indicates support for at least one of a first mode of operation or a second mode of operation; transmit, to the network entity, a backscattered signal comprising the first mode of operation; and communicate with the network entity in response to the first mode of operation of the backscattered signal actively supported by the access control indication.

Referring again to FIG. 1, in certain aspects, the base station 102 (e.g., as an example of a reader) may comprise an indication component 199 that may be configured to provide, to a passive node or a semi-passive node, an access control indication that indicates support for at least one of a first mode of operation or a second mode of operation; monitor for a backscattered signal from the passive node or the semi-passive node that is supported by the access control indication, wherein the backscattered signal comprises the first mode of operation; and communicate with the passive node or the semi-passive node in response to the first mode of operation of the backscattered signal actively supported by the access control indication.

Although the following description may be focused on 5G NR, the concepts described herein may be applicable to other similar areas, such as LTE, LTE-A, CDMA, GSM, and other wireless technologies.

Figures 2A, 2B, 2C, 2D:
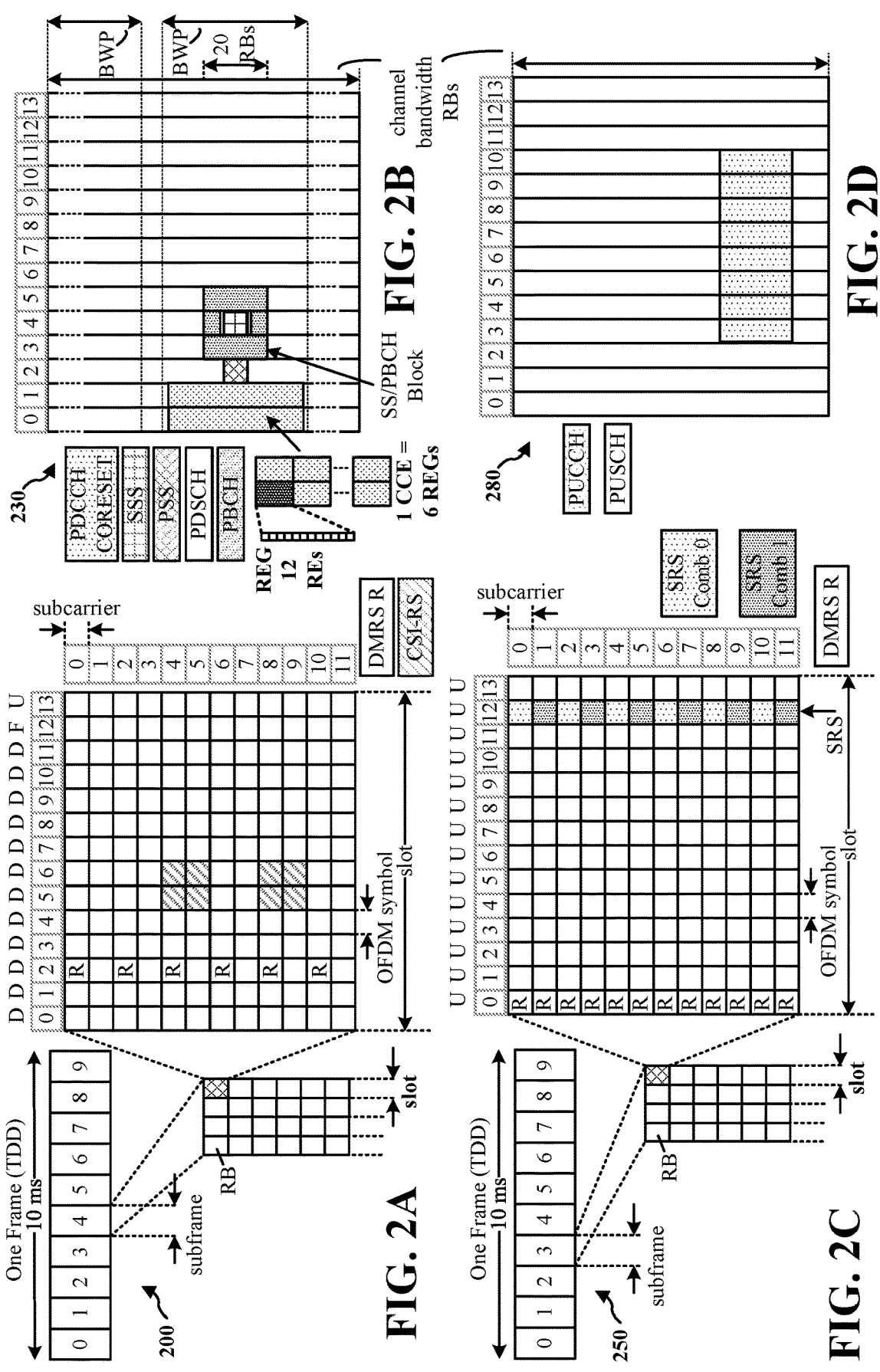
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$ [KHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu \cdot 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
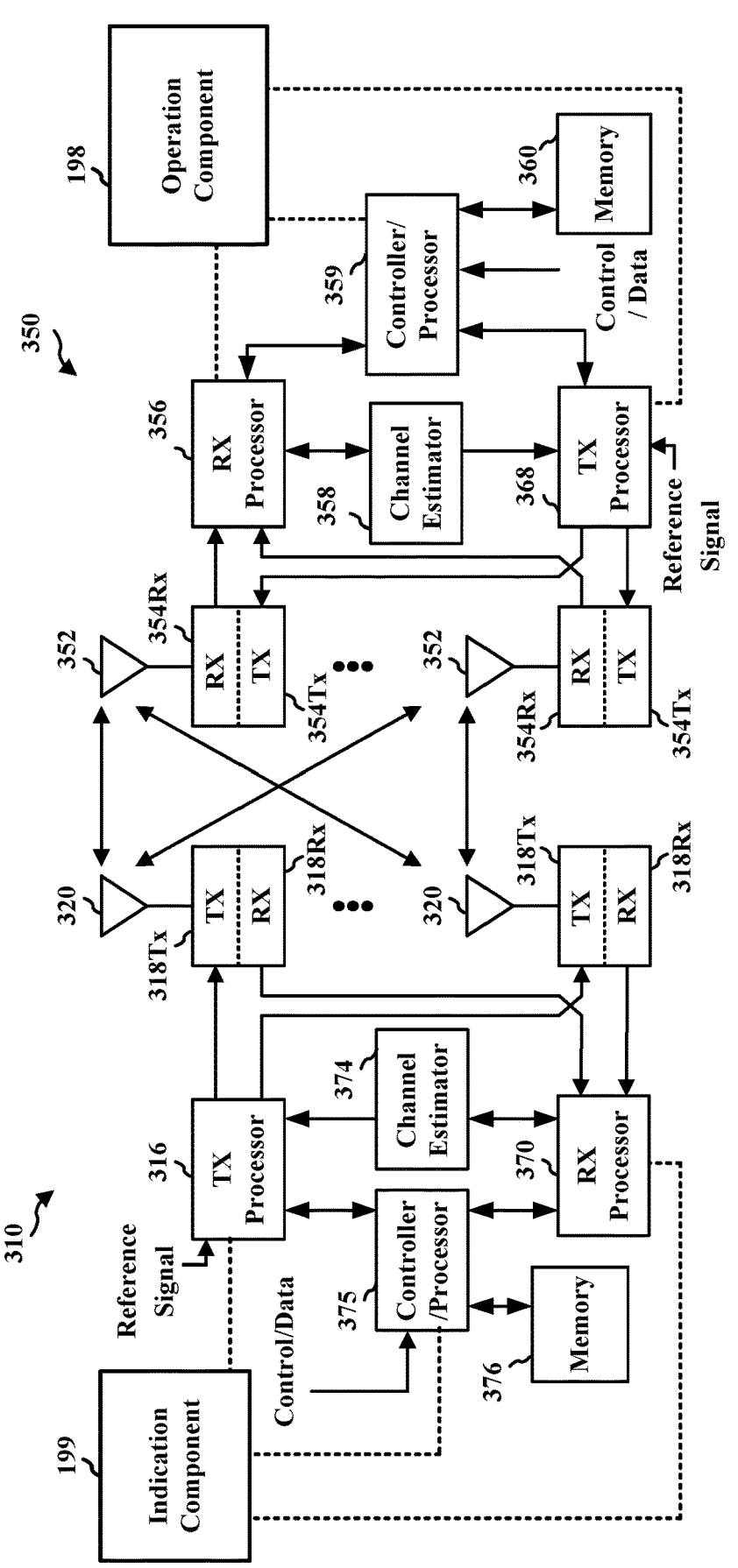
FIG. 3 is a diagram illustrating an example of two devices in an access network.

FIG. 3 is a block diagram of two devices in communication in an access network. In some aspects, the two devices may correspond to a base station 310 in communication with a UE 350 in the access network. In some aspects, the two devices may include a tag (or other passive/semi-passive device) and a reader, which may include one or more of the components described for the devices in FIG. 3. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the operation component 198 of FIG. 1.

At least one of the TX processor 316, the RX processor 370, and the controller/processor 375 may be configured to perform aspects in connection with the indication component 199 of FIG. 1.

In some aspects, a wireless communication system may include one or more devices that harvest or acquire energy from a wireless signal and use the harvested energy for wireless communication, sensing, or other operations of the device. In some aspects, a device (e.g., a UE) may include an energy harvesting modality (e.g., a backscatter radio). Backscattering technology offers very low-power wireless communication by enabling the nodes to piggyback their data on the RF signals of other devices, instead of generating and transmitting their own signals, which may eliminate the need for an active transmitter and power-hungry RF components and enabling backscatter devices to communicate on a very low energy budget.

Figure 4:
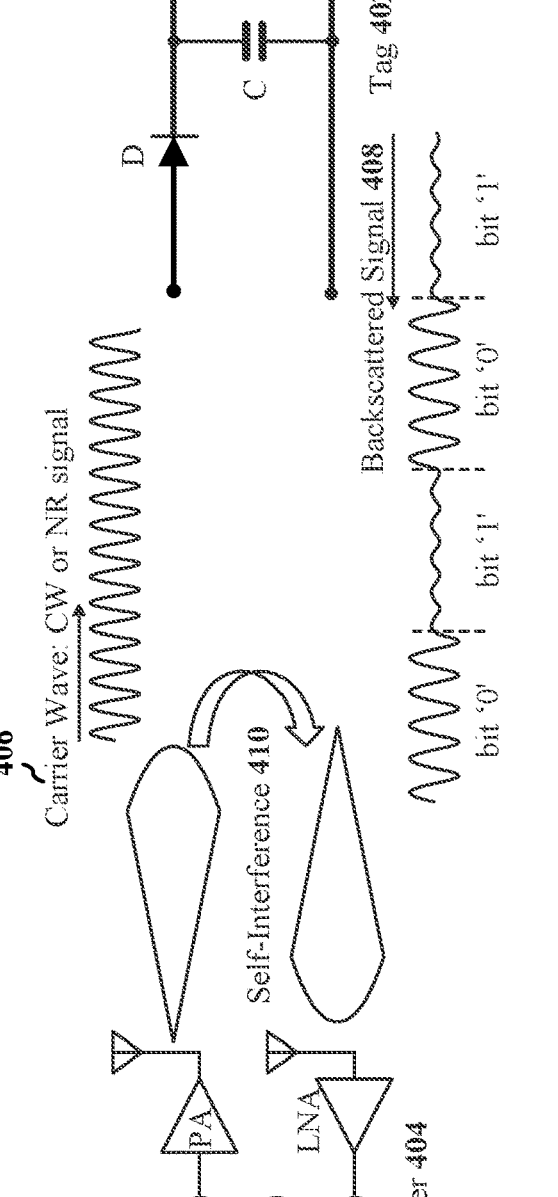
FIG. 4 illustrates an example of a tag that receives an energy transfer signal from a reader.

FIG. 4 illustrates a diagram 400 of a backscattering system which may operate at higher frequencies. The backscattering system comprises a radio frequency identification (RFID) node or tag 402 and a monostatic reader 404. The RFID node or tag 402 receives an energy transfer signal (e.g., carrier wave 406) from the monostatic reader 404 which may use directional antennas to transmit and receive beams and compensate for path loss that may be present at higher frequencies. The RFID tag 402 may be a passive device or a semi-passive device with very low cost, complexity, and energy consumption.

The RFID tag 402 is an example of an energy receiver that may obtain energy from an energy transfer signal (or an energy signal) from an energy transmitter (e.g., the reader 404). An energy transfer signal may comprise a continuous wave (CW) that may be utilized to power up the RFID node or tag 402. The RFID node or tag 402 may be a passive tag that does not have a power source and thereby harvests energy from the energy transfer signal (e.g., 406) for power. Upon the RFID node or tag 402 being powered up, the RFID reader 404 may provide a modulated signal that may comprise one or more commands. RFID devices may include a transponder (e.g., the RFID tag 402) that emits an information-bearing signal, such as a backscattered signal 408, upon receiving a signal from the RFID reader 404. That is, the RFID reader 404 may transmit the energy transfer signal (e.g., 406) as well as an information signal to a passive RFID microchip (e.g., RFID tag 402) that operates without a battery source.

The RFID tag 402 may be configured to operate without the battery source at a low operational expenditure (OPEX), low maintenance cost, and/or increased lifecycle. Other types of RFID tags may include battery sources. For example, semi-passive RFID devices and active RFID devices may have a battery source, but may also be associated with a higher cost. If the RFID reader 404 is able to provide enough received energy to the RFID tag 402, the RFID tag 402 may harvest the received energy to perform an operation during communication occasions or may harvest the received energy to charge an associated battery. Passive RFID tags may harvest the received energy over-the-air in order to power transmit/receive circuitry at the RFID tag 402. The energy transfer signal (e.g., 406) transmitted to the RFID tag 402, by the reader 404, may trigger the transmission of the backscattered signal 408 from the RFID tag 402. The RFID tag 402 may absorb or reflect signals from the RFID reader 404 based on the information to be communicated between the RFID tag 402 and the RFID reader 404. The RFID tag 402 may include a decreased number of active RF components (e.g., no active RF component) in some cases.

The tag 402 may not be capable of typical beam management procedures that involve baseband processing of received beam reference signals, and sending of measurement reports, and/or generating and sending uplink reference signals. The reader 404 may establish communication with the tag 402 through well-aligned directional beams. The reader 404 communicating to the tag 402 may transmit a query signal and listen for a response from the tag 402 at the same time. The response from the tag 402 may be a modulated version of the transmitted signal (e.g., 406) and the reader 404 may decode the backscattered signal 408.

The reader 404 may receive the backscattered signal and separate the backscattered signal from its own transmitted query signal and decodes the response from the tag 402. The signal received by the reader 404 may be orders of magnitude weaker than the query signal transmitted by the reader 404, due in part to significant path loss. The reader may amplify the reflected signal, however, self-interference 410 may also be amplified and may result in saturation of receiver of the reader 404. In some instances, the reader 404 may be configured to employ an expensive full-duplex radio to cancel the self-interference, however, this comes at a higher cost and complexity.

Figure 5A:
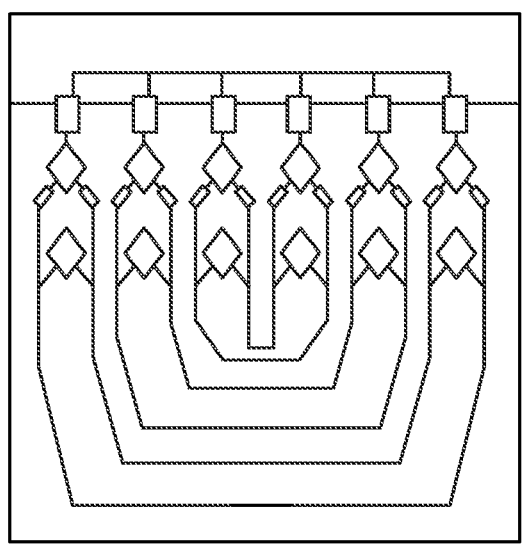
FIG. 5A is a diagram illustrating an example of a polarization conversion array.
Figure 5B:
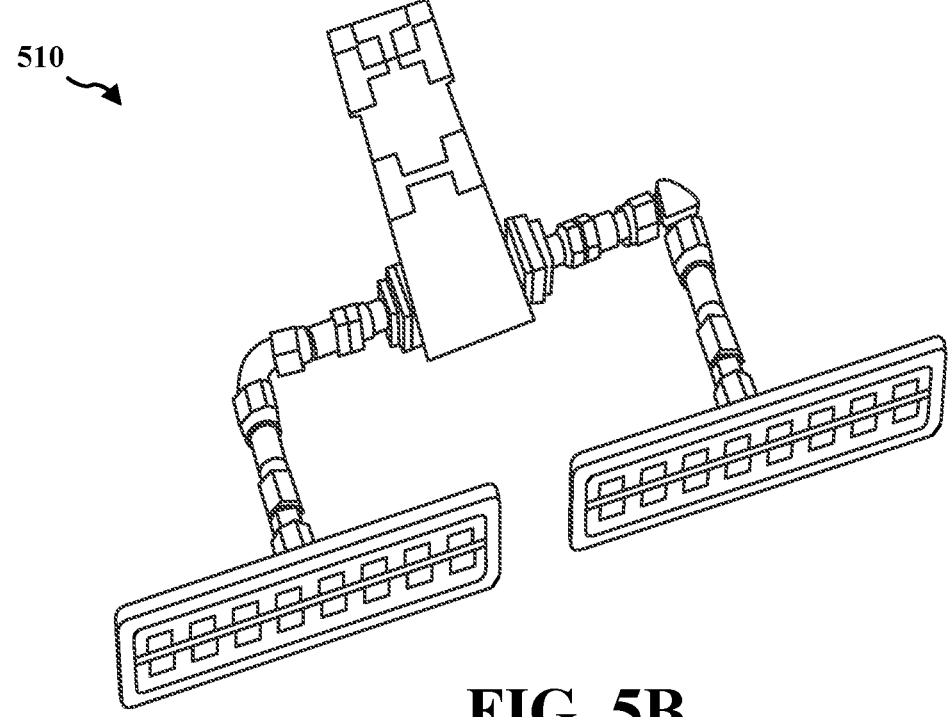
FIG. 5B is a diagram illustrating an example of a polarization conversion array.

In some instances, a UE comprising a tag may be capable of polarization conversion, which may assist with the reduction of self-interference at the reader in view of the sensitivity of the reader. For example, diagram 500 of FIG. 5A shows an example of an architecture that may allow polarization conversion. The diagram 500 of FIG. 5A is an example of a Van-*Atta* array based passive beamforming for backscattering in higher bands. The Van-*Atta* array may modulate and reflect a received signal back in the direction of arrival regardless of an incident angle. Tags employing the Van-*Atta* array may reduce self-interference at the reader. The diagram 510 of FIG. 5B is an example of an ultra-low power tag that may be utilized to identify or locate street markings or other roadside features over extended distances in the context of autonomous vehicles.

Figures 6A, 6B, 6C:
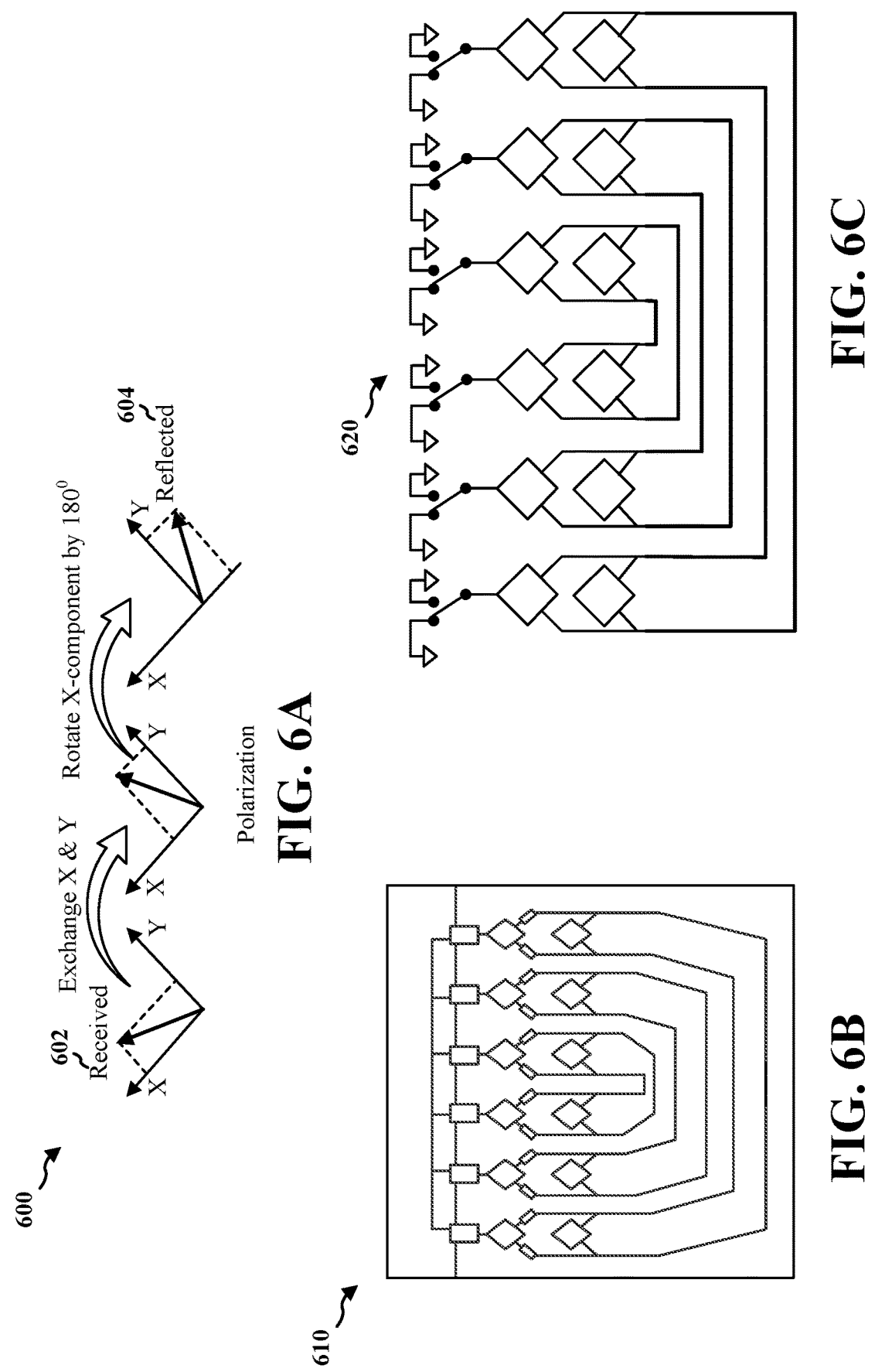
FIG. 6A is a diagram illustrating an example of polarization conversion.
FIG. 6B is a diagram illustrating an example architecture of a polarization conversion array.
FIG. 6C is a diagram illustrating an example architecture of a polarization conversion array.
Figures 7A, 7B:
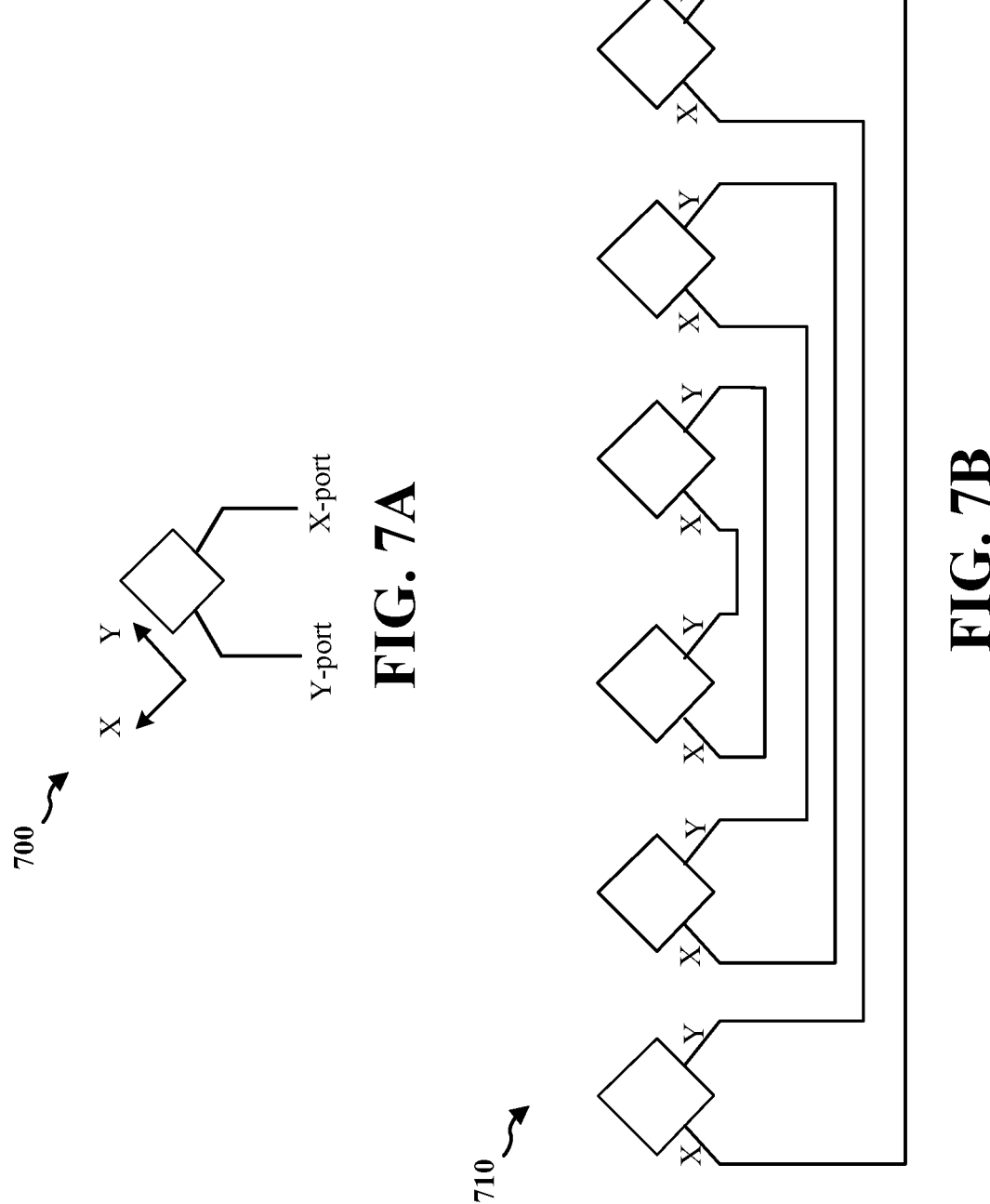
FIG. 7A is a diagram illustrating an example of a dual-pole single element patch antenna.
FIG. 7B is a diagram illustrating an example of a feed network using multiple dual-pole single element patch antennas.

FIG. 6A provides a diagram 600 of polarization conversion. For example, a tag may receive a signal from the reader. The received signal 602 may comprise an X polarization and a Y polarization. The X and Y polarization of the received signal may be exchanged, and then the X component of the polarization may be rotated by 180 degrees, to produce the reflected signal 604. Diagram 610 of FIG. 6B and diagram 620 of FIG. 6C provide example architectures of a polarization conversion array. FIG. 7A provides a diagram 700 of a dual-pole single element patch antenna. FIG. 7B provides a diagram 710 of a feed network using multiple dual-pole single element patch antennas. For example, the feed network of FIG. 7B is configured to change polarization of the received signal and then reflect a backscattered signal having a changed polarization. The X-port of an antenna is connected to a corresponding Y-port of another antenna. In some aspects, the transmission lines between the X-Y connections may introduce an additional 180 degree phase rotation for X-Y connections.

Aspects presented herein provide a configuration for passive or semi-passive device with polarization conversion capabilities. For example, to support backscattering with polarization conversion, both the passive or semi-passive device (e.g., tag) and the reader should support polarization conversion and coordinate with each other to implement polarization conversion. The passive or semi-passive device (e.g., tag) and/or the reader may have the capability to support one or more modes of operation and may coordinate with each other to select or switch between the one or more modes of operation.

In some instances, a network entity (e.g., base station, UE, etc.) may comprise, correspond to, or operate as a reader and may be configured to use antennas with orthogonal polarization for its transmitter and receiver. The reader of the network entity may send a query signal to the tag (e.g., UE) in an X polarization and may receive signals in an orthogonal polarization (e.g., Y polarization). The tag may receive the query signal in the X polarization and may reflect a backscatter signal to the reader in the X polarization. The backscatter signal from the tag to the reader may not be aligned with the receive Y polarization at the reader, such that the reader may not be able to detect the backscattered signal.

In some instances, the modes of operation may include polarization conversion or without polarization conversion. Diagram 800 of FIG. 8A provides an example of an array for polarization conversion, where an X-port is connected to a Y-port. In instances where polarization conversion may be utilized, the polarization conversion may provide separation between the signal from the reader to the tag and the backscattered signal. The separation may assist in a reduction of self-interference at the reader, which may enhance a link budget or range of the reader. In some instances, the separation may also assist in allowing for a reduced complexity of the reader architecture, due in part to the reduction of the self-interference.

Diagram 810 of FIG. 8B provides an example of an array without polarization conversion, where each X-port is connected to a corresponding X-port, and each Y-port is connected to a corresponding Y-port. In instances where self-interference at the reader is address without using polarization conversion, the mode of operation may include a mode of operation without polarization conversion. The mode of operation being without polarization conversion may allow sing all the degrees of freedom which may allow for an enhanced diversity or multi-layer communication. In some instances, a channel from different channel states (e.g., X-X versus Y-Y channels) may be in a poor channel state, due in part to deep fade, etc., such that using such channel may be inefficient or wasteful, especially in instances where polarization conversion is utilized. In such instances, it may be advantageous to use one channel polarization without polarization conversion. In some instances, the reader (e.g., UE or network entity) may use one polarization for communication with a tag or for backscattering, while another polarization may be used for communicating with other devices. The mode of operation without polarization conversion may be used in instances where the tag is configured to perform bistatic backscattering such that a self-interference issue is not present.

Signaling between the reader and tag may indicate the supported modes of operation. For example, signaling between the reader and tag may indicate whether the modes of operation of polarization conversion or without polarization conversion is supported. In some aspects, the reader may indicate whether the reader only supports tags of a given mode, such that access to tags differently configured is barred. For example, the reader may provide an access control indication that indicates that the reader may support at least a first mode of operation or a second mode of operation. The first or second mode of operation may comprise at least modes of operation of polarization conversion or without polarization conversion. In some aspects, the reader may be configured to support both the first and second mode of operation. For example, the reader may be configured to support the modes of operation of polarization conversion and without polarization conversion. In such instances, the reader may provide an access control indication that indicates that the reader supports the modes of operation of polarization conversion and without polarization conversion. In some aspects, the reader may have different resources or a configuration for serving different classes or modes. For example, the reader of a network entity may provide a continuous wave signal and may be monitoring for a backscattered signal on either the first or second mode of operation. If the reader is monitoring on the first mode of operation, resources, such as but not limited to random access channels (RACH), may not be shared with resources the reader uses to monitor for a backscattered signal on the second mode of operation. The network entity (e.g., base station or UE) comprising the reader may have common resources (e.g., SSB) and two sets of RACH configuration. In such instances, the reader may use a first set of the RACH configuration for the first mode of operation and a second set of the RACH configuration for the second mode of operation. The reader may desire to receive a RACH in a backscattering manner and tune itself differently whether the backscattering is through the first mode of operation or the second mode of operation. In yet some aspects, the indication of modes of operation supported by the reader may be provided to the tag by the reader or another device (e.g., network entity).

In some aspects, a tag may be configured to support the first mode of operation and the second mode of operation, where the first and second modes of operation may comprise at least the modes of operation of polarization conversion and without polarization conversion. In such instances, the tag may be configured to switch between the first and second modes of operation. The tag may switch between the first and second modes of operation dynamically and/or in a semi-statically. In some aspects, the tag may report the capabilities of the tag. For example, the tag may transmit, to the reader or network entity associated with the reader, a capability indication that indicates support for at least one of the first and/or second modes of operation. In some aspects, the capability indication may indicate that the tag supports the first mode of operation, the second mode of operation, or the first and second modes of operation. The tag may also be configured to indicate a latency associated with a switch between the first and second modes of operation. In some aspects, the tag may provide an indication (e.g., implicitly or explicitly) of the mode of operation. For example, an explicit indication of the mode of operation may comprise the tag indicating the polarization conversion capability to the reader upon association, which may be possible with the capability report sent by the tag to the network entity associated with the reader. In aspects in which the tag is a UE, the report may be provided in UE capability signaling or a UE capability report, for example. In another example, an implicit indication of the mode of operation may occur in instances where the network entity has different modes of communicating with different devices, discussed above, the tag may be aware of the different sets of resources and based on the modes of the tag, the tag may select one set of resources to access the reader and to send the RACH. The network entity, upon receiving the RACH from the tag, may understand that this RACH is from a particular mode (e.g., first or second mode) of the tag.

In some aspects, the choice between the first or second modes of operation may be indicated by the reader or selected by the tag, or may be recommended by the tag. In instances where the tag selects or recommends a mode, the selection or recommendation may be based on criteria that may be indicated by the network entity or reader. In some aspects, the criteria may be based on a threshold on the available energy, or if tag is configured to perform channel measurements, the decision may be based on thresholds on channel measurement metrics. In some aspects, the choice may be based on at least one of a link budget, an amount of self-interference (e.g., beam specific), energy-level at the tag, the horizontal-horizontal channel state and the vertical-vertical channel state. In some aspects, the selection or indication may be dynamic, semi-persistent, semi-static, periodic, or event-triggered.

Figure 9:
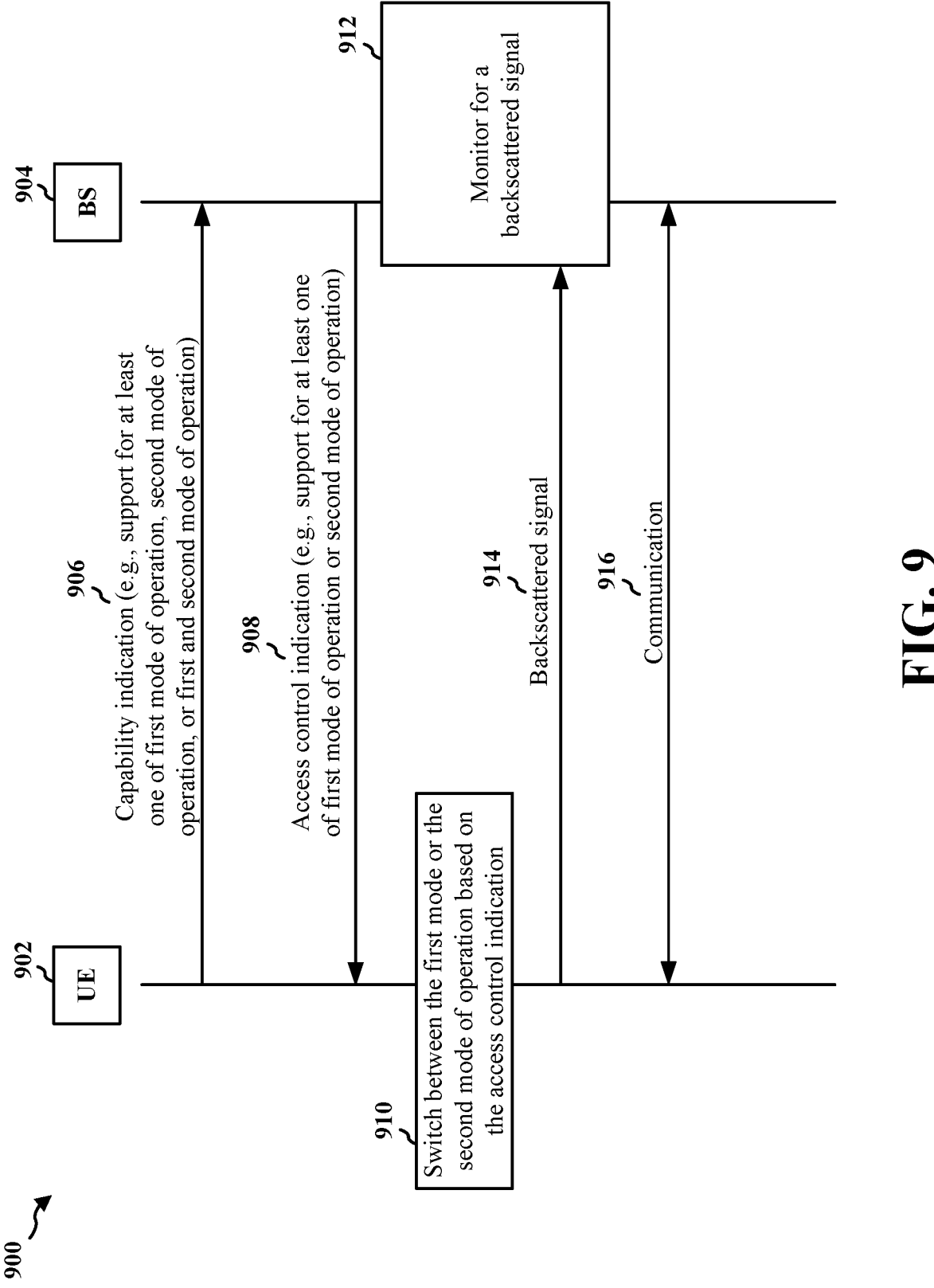
FIG. 9 is a call flow diagram of signaling between a passive or semi-passive device and a reader or network node.

FIG. 9 is a call flow diagram 900 of signaling between a tag 902 (e.g., which may also be referred to as a passive device, semi-passive device, energy harvesting device, backscatter device, or a UE) and a reader or network node 904. The tag 902 may correspond to the tag 402 in FIG. 4, and may support any of the aspects described in connection with FIGS. 5A-8B. The reader/network node 904 may be configured to provide at least one cell, in some aspects. In some aspects, a UE may support a passive or a semi-passive mode for the exchange of signaling with the reader/network node 904. For example, in the context of FIG. 1, the reader/network node 904 may correspond to base station 102 and the tag 902 may correspond to at least UE 104. In another example, in the context of FIG. 3, the reader/network node 904 may correspond to base station 310 and the tag 902 may correspond to UE 350. In some aspects, the reader/network node 904 may correspond to a UE. The reader/network node 904 may correspond to the reader in FIG. 4. The reader may support one or more of the aspects described in connection with FIGS. 5A-8B, in some examples. In some aspects, an additional network node 905 may also perform one or more aspects.

At 906, the tag 902 may transmit a capability indication to the reader/network node 904 and/or a network node 905. In some aspects, 904 may correspond to a reader, and the network node 905 may correspond to a base station or other network node. The reader/network node 904 and/or network node 905 may obtain the capability indication from the tag 902. The capability indication may indicate that the passive or semi-passive node supports at least one of the first mode of operation, the second mode of operation, or the first mode of operation and the second mode of operation.

At 908, the reader/network node 904 or the network node 905 may provide an access control indication to the passive node or the semi-passive node. The tag 902 may receive the access control indication from the reader/network node 904 or the network node 905. The access control indication may indicate support for at least one of a first mode of operation or a second mode of operation. In some aspects, a first set of resources for communication (e.g., which may be referred to as a first set of communication resources) may be utilized for the first mode of operation and a second set of resources for communication (e.g., which may be referred to as a second set of communication resources) are utilized for the second mode of operation. In some aspects, modes of operation may comprise at least an operation with polarization conversion or an operation without polarization conversion. The operation with the polarization conversion may provide separation between a query signal provided to the passive node or the semi-passive node and a backscattered signal. In some aspects, the access control indication may indicate support for passive nodes or semi-passive nodes that operate in the first mode of operation, the second mode of operation, or both the first mode of operation and the second mode of operation. As illustrated, if the access control indication 908 is provided by a network node 905 that is separate from the reader, the network node may also indicate the access control indication to the reader. In other aspects, the network node 905 may provide the indication to the tag 902 without a further indication to the reader.

At 910, the tag 902 may switch between the first mode of operation or the second mode of operation based on the access control indication. As an example, the passive or semi-passive component of a UE may switch between the first mode of operation or the second mode of operation based on the access control indication.

At 911, the reader (e.g., 904) and/or another device, such as the network node 905, may transmit a signal to the tag 902. The signal may include a carrier wave or other signal, such as an NR signal, e.g., as described in connection with FIG. 4. As illustrated at 913, the tag 902 backscatters the signal (e.g., 911) as a backscattered signal 914 based on the first mode or the second mode according to the access control indication. For example, the tag 902 may backscatter the received signal 911 with or without polarization conversion according to the access control indication 908.

At 912, the reader/network node 904 may monitor for a backscattered signal from the passive node or the semi-passive node of the tag 902 that is supported by the access control indication. The backscattered signal may comprise at least the first mode of operation. In some aspects, the backscattered signal may indicate a current mode of operation of the passive node or the semi-passive node. In some aspects, the current mode of operation of the passive node or the semi-passive node may comprise at least one of the first mode of operation, the second mode of operation, or a combination of the first mode and the second mode of operation.

At 914, the passive or semi-passive node may transmit a backscatter signal to the reader/network node 904. The reader/network node 904 may obtain the backscatter signal from the passive or semi-passive node of the tag 902. The backscatter signal may comprise at least the first mode of operation. In some aspects, the backscattered signal may indicate a mode of operation of the backscattered signal. In some aspects, the backscattered signal may indicate a current mode of operation of the passive node or the semi-passive node.

At 916, the passive or semi-passive node of the tag 902 and the reader/network node 904 may communicate with each other. The passive or semi-passive node may communicate with the base station in response to the first mode of operation of the backscattered signal actively supported by the access control indication. The base station may communicate with the passive node or the semi-passive node in response to the first mode of operation of the backscattered signal actively supported by the access control indication. In some aspects, communication between the passive or semi-passive node and the base station may not occur in response to the first mode of operation of the backscattered signal not being indicated as supported by the access control indication.

FIG. 10 is a flowchart 1000 of a method of wireless communication at a network entity. The method may be performed by a base station (e.g., the base station 102; the reader/network node 904; the network entity 1202, 1502). One or more of the illustrated operations may be omitted, transposed, or contemporaneous. The method may allow reader to indicate modes of operations that are supported by the reader.

At 1002, the network entity may provide an access control indication. For example, 1002 may be performed by indication component 199 of network entity 1202. The network entity may provide the access control indication to a passive node or a semi-passive node. The access control indication may indicate support for at least one of a first mode of operation or a second mode of operation. In some aspects, a first set of resources for communication may be utilized for the first mode of operation and a second set of resources for communication are utilized for the second mode of operation. In some aspects, modes of operation may comprise at least an operation with polarization conversion or an operation without polarization conversion. The operation with the polarization conversion may provide separation between a query signal provided to the passive node or the semi-passive node and a backscattered signal. In some aspects, the access control indication may indicate support for passive nodes or semi-passive nodes that operate in the first mode of operation, the second mode of operation, or both the first mode of operation and the second mode of operation.

At 1004, the network entity may monitor for a backscattered signal. For example, 1004 may be performed by indication component 199 of network entity 1202. The network entity may monitor for the backscattered signal from the passive node or the semi-passive node that is supported by the access control indication. The backscattered signal may comprise at least the first mode of operation. In some aspects, the backscattered signal may indicate a current mode of operation of the passive node or the semi-passive node. In some aspects, the current mode of operation of the passive node or the semi-passive node may comprise at least one of the first mode of operation, the second mode of operation, or a combination of the first mode and the second mode of operation.

At 1006, the network entity may communicate with the passive node or the semi-passive node. For example, 1006 may be performed by indication component 199 of network entity 1202. The network entity may communicate with the passive node or the semi-passive node in response to the first mode of operation of the backscattered signal actively supported by the access control indication. In some aspects, communication with the passive node or the semi-passive node may not occur in response to the first mode of operation of the backscattered signal not being indicated as supported by the access control indication.

FIG. 11 is a flowchart 1100 of a method of wireless communication at a network entity. The method may be performed by a base station (e.g., the base station 102; the network entity 1202, 1502). One or more of the illustrated operations may be omitted, transposed, or contemporaneous. The method may allow reader to indicate modes of operations that are supported by the reader.

At 1102, the network entity may obtain a capability indication. For example, 1102 may be performed by indication component 199 of network entity 1202. The network entity may obtain the capability indication from a passive node or a semi-passive node. The capability indication may indicate that the passive node or the semi-passive node supports at least one of a first mode of operation, a second mode of operation, or the first mode of operation and the second mode of operation.

At 1104, the network entity may provide an access control indication. For example, 1104 may be performed by indication component 199 of network entity 1202. The network entity may provide the access control indication to the passive node or the semi-passive node. The access control indication may indicate support for at least one of a first mode of operation or a second mode of operation. In some aspects, a first set of resources for communication may be utilized for the first mode of operation and a second set of resources for communication are utilized for the second mode of operation. In some aspects, modes of operation may comprise at least an operation with polarization conversion or an operation without polarization conversion. The operation with the polarization conversion may provide separation between a query signal provided to the passive node or the semi-passive node and a backscattered signal. In some aspects, the access control indication may indicate support for passive nodes or semi-passive nodes that operate in the first mode of operation, the second mode of operation, or both the first mode of operation and the second mode of operation.

At 1106, the network entity may monitor for a backscattered signal. For example, 1106 may be performed by indication component 199 of network entity 1202. The network entity may monitor for the backscattered signal from the passive node or the semi-passive node that is supported by the access control indication. The backscattered signal may comprise at least the first mode of operation. In some aspects, the backscattered signal may indicate a current mode of operation of the passive node or the semi-passive node. In some aspects, the current mode of operation of the passive node or the semi-passive node may comprise at least one of the first mode of operation, the second mode of operation, or a combination of the first mode and the second mode of operation.

At 1108, the network entity may communicate with the passive node or the semi-passive node. For example, 1108 may be performed by indication component 199 of network entity 1202. The network entity may communicate with the passive node or the semi-passive node in response to the first mode of operation of the backscattered signal actively supported by the access control indication. In some aspects, communication with the passive node or the semi-passive node may not occur in response to the first mode of operation of the backscattered signal not being indicated as supported by the access control indication.

Figure 12:
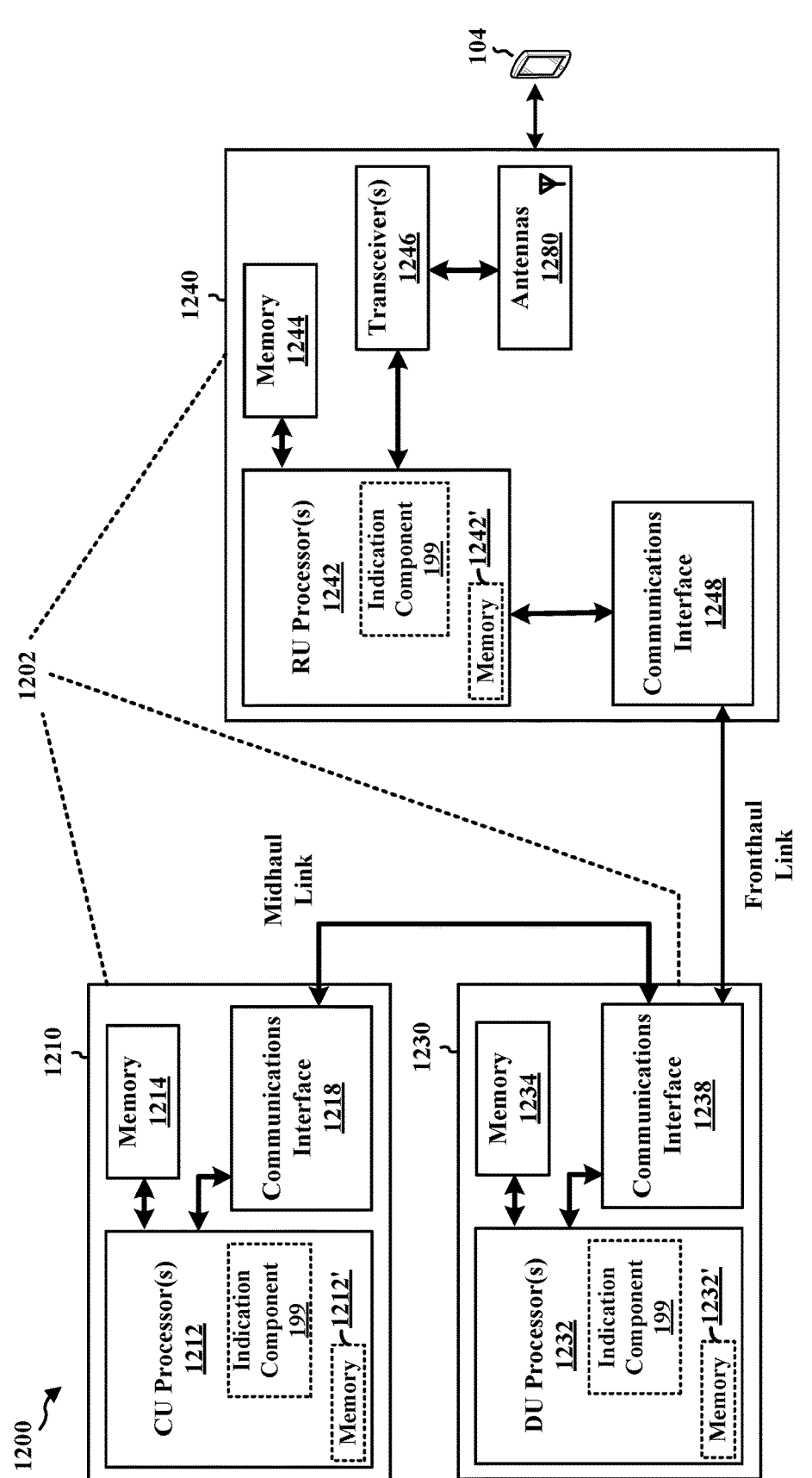
FIG. 12 is a diagram illustrating an example of a hardware implementation for an example network entity.

FIG. 12 is a diagram 1200 illustrating an example of a hardware implementation for a network entity 1202. In some aspects, the network entity 1202 may correspond to a reader or may be configured to perform reader functionality. In some aspects, the network entity may correspond to a UE that operates as a reader. For example, the network entity 1202 may correspond to the reader 404 in FIG. 4, the reader/network node 904 in FIG. 9 or the network node 905 in FIG. 9. In some aspects, the network entity 1202 may be a BS, a component of a BS, or may implement BS functionality. In some aspects, the network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, antennas 1280, and a communications interface 1248. The RU 1240 communicates with the tag 902. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, to a passive node or a semi-passive node, an access control indication that indicates support for at least one of a first mode of operation or a second mode of operation; monitor for a backscattered signal from the passive node or the semi-passive node that is supported by the access control indication, wherein the backscattered signal comprises the first mode of operation; and communicate with the passive node or the semi-passive node in response to the first mode of operation of the backscattered signal actively supported by the access control indication. The component 199 may be further configured to perform any of the aspects described in connection with the flowcharts in FIG. 10 or 11, or performed by the reader 404, the reader/network node 904, and/or the network node 905. The component 199 may be within one or more processors of one or more of the CU 1210, DU 1230, and the RU 1240 or of 310. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for providing, to a passive node or a semi-passive node, an access control indication that indicates support for at least one of a first mode of operation or a second mode of operation. The network entity includes means for monitoring for a backscattered signal from the passive node or the semi-passive node that is supported by the access control indication, wherein the backscattered signal comprises the first mode of operation. The network entity includes means for communicating with the passive node or the semi-passive node in response to the first mode of operation of the backscattered signal actively supported by the access control indication. The network entity further includes means for obtaining, from the passive node or the semi-passive node, a capability indication that indicates support for at least one of the first mode of operation, the second mode of operation, or the first mode of operation and the second mode of operation. The network entity may further include means for performing any of the aspects described in connection with the flowcharts in FIG. 10 or 11, or performed by the reader 404, the reader/network node 904, and/or the network node 905. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

FIG. 13 is a flowchart 1300 of a method of wireless communication at a passive or semi-passive node. The method may be performed by a passive or semi-passive node that may correspond to, or be referred to as, a passive device, a semi-passive device, a backscatter device, a tag, a UE (e.g., the UE 104, 350; the tag 402, 902, the apparatus 1504) comprising a passive or semi-passive node or supporting a passive or semi-passive operation. One or more of the illustrated operations may be omitted, transposed, or contemporaneous. The method may enable a tag to indicate modes of operations that are supported by the tag.

At 1302, the passive or semi-passive node may receive an access control indication. For example, 1302 may be performed by operation component 198 of apparatus 1504. The passive or semi-passive node may receive the access control indication from a network entity. The access control indication may indicate support for at least one of a first mode of operation or a second mode of operation. In some aspects, modes of operation may comprise at least an operation with polarization conversion or an operation without polarization conversion. The operation with the polarization conversion may provide separation between a query signal provided to the passive node or the semi-passive node and the backscattered signal. In some aspects, the access control indication may indicate support for passive nodes or semi-passive nodes that operate in the first mode of operation, the second mode of operation, or both the first mode of operation and the second mode of operation.

At 1304, the passive or semi-passive node may transmit a backscatter signal. For example, 1304 may be performed by operation component 198 of apparatus 1504. The passive or semi-passive node may transmit the backscatter signal to the network entity. The backscatter signal may comprise at least the first mode of operation. In some aspects, the backscattered signal may indicate a mode of operation of the backscattered signal. In some aspects, the backscattered signal may indicate a current mode of operation of the passive node or the semi-passive node.

At 1306, the passive or semi-passive node may communicate with the network entity. For example, 1306 may be performed by operation component 198 of apparatus 1504. The passive or semi-passive node may communicate with the network entity in response to the first mode of operation of the backscattered signal actively supported by the access control indication. In some aspects, communication with the network entity may not occur in response to the first mode of operation of the backscattered signal not being indicated as supported by the access control indication.

FIG. 14 is a flowchart 1400 of a method of wireless communication at a passive or semi-passive node. The method may be performed by a UE (e.g., the UE 104; the apparatus 1504). One or more of the illustrated operations may be omitted, transposed, or contemporaneous. The method may allow tag to indicate modes of operations that are supported by the tag.

At 1402, the passive or semi-passive node may transmit a capability indication. For example, 1402 may be performed by operation component 198 of apparatus 1504. The passive or semi-passive node may transmit the capability indication to a network entity. The capability indication may indicate that the passive or semi-passive node supports at least one of the first mode of operation, the second mode of operation, or the first mode of operation and the second mode of operation.

At 1404, the passive or semi-passive node may receive an access control indication. For example, 1404 may be performed by operation component 198 of apparatus 1504. The passive or semi-passive node may receive the access control indication from a network entity. The access control indication may indicate support for at least one of a first mode of operation or a second mode of operation. In some aspects, modes of operation may comprise at least an operation with polarization conversion or an operation without polarization conversion. The operation with the polarization conversion may provide separation between a query signal provided to the passive node or the semi-passive node and the backscattered signal. In some aspects, the access control indication may indicate support for passive nodes or semi-passive nodes that operate in the first mode of operation, the second mode of operation, or both the first mode of operation and the second mode of operation.

At 1406, the passive or semi-passive node may switch between the first mode of operation or the second mode of operation. For example, 1406 may be performed by operation component 198 of apparatus 1504. The passive or semi-passive node may switch between the first mode of operation or the second mode of operation based on the access control indication.

At 1408, the passive or semi-passive node may transmit a backscatter signal. For example, 1408 may be performed by operation component 198 of apparatus 1504. The passive or semi-passive node may transmit the backscatter signal to the network entity. The backscatter signal may comprise at least the first mode of operation. In some aspects, the backscattered signal may indicate a mode of operation of the backscattered signal. In some aspects, the backscattered signal may indicate a current mode of operation of the passive node or the semi-passive node.

At 1410, the passive or semi-passive node may communicate with the network entity. For example, 1410 may be performed by operation component 198 of apparatus 1504. The passive or semi-passive node may communicate with the network entity in response to the first mode of operation of the backscattered signal actively supported by the access control indication. In some aspects, communication with the network entity may not occur in response to the first mode of operation of the backscattered signal not being indicated as supported by the access control indication.

Figure 15:
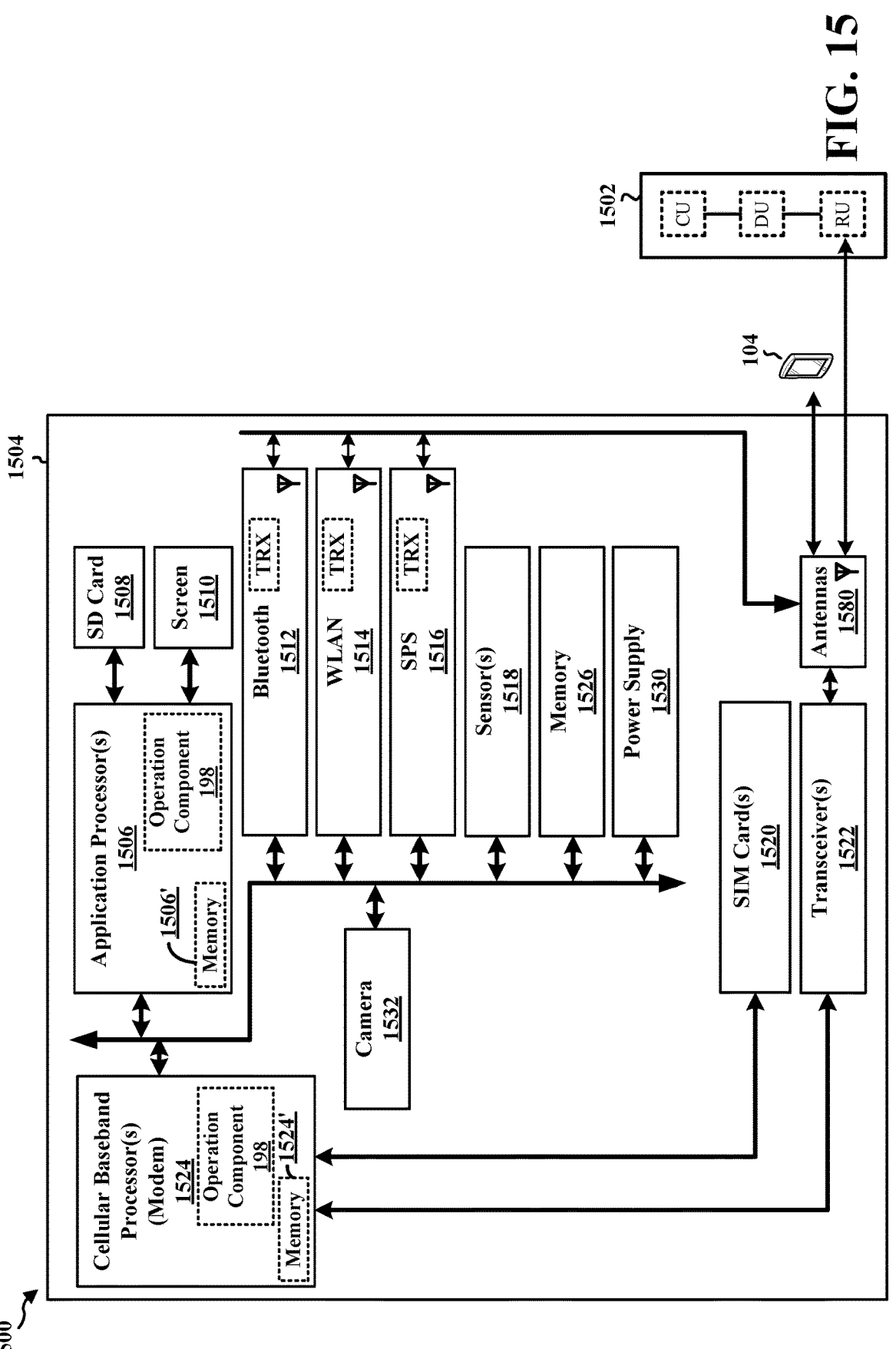
FIG. 15 is a diagram illustrating an example of a hardware implementation for an example apparatus and/or passive device.

FIG. 15 is a diagram 1500 illustrating an example of a hardware implementation for an apparatus 1504. The apparatus 1504 may be a passive or semi-passive node that may correspond to, or be referred to as, a passive device, a semi-passive device, a backscatter device, a tag, a UE. In some aspects, the apparatus may be UE, a component of a UE, or may implement UE functionality. In other aspects, the apparatus may not support additional capabilities of a UE omit one or more of the components illustrated in FIG. 15. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RA-DAR), sound navigation and ranging (SONAR), magnetom-eter, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/ memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cel-lular baseband processor(s) 1524/application processor(s) 1506, causes the cellular baseband processor(s) 1524/appli-cation processor(s) 1506 to perform the various functions described supra. The cellular baseband processor(s) 1524 and the application processor(s) 1006 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the applica-tion processor(s) 1506, and in another configuration, the apparatus 1504 may be the entire UE (e.g., see UE 350 of FIG. 3) and include the additional modules of the apparatus 1504.

As discussed supra, the component 198 may be config-ured to receive, from a network entity, an access control indication that indicates support for at least one of a first mode of operation or a second mode of operation; transmit, to the network entity, a backscattered signal comprising the first mode of operation; and communicate with the network entity in response to the first mode of operation of the backscattered signal actively supported by the access control indication. The component 198 may be further configured to perform any of the aspects described in connection with the flowchart in FIG. 13, FIG. 14, and/or any of the aspects performed by the tag in FIGS. 4 and/or 9. The component 198 may be within the cellular baseband processor(s) 1524, the application processor(s) 1506, or both the cellular base-band processor(s) 1524 and the application processor(s) 1506. The component 198 may be one or more hardware components specifically configured to carry out the stated processes/algorithm, implemented by one or more proces-sors configured to perform the stated processes/algorithm, stored within a computer-readable medium for implemen-tation by one or more processors, or some combination thereof. When multiple processors are implemented, the multiple processors may perform the stated processes/algo-rithm individually or in combination. As shown, the appa-ratus 1504 may include a variety of components configured for various functions. In one configuration, the apparatus 1504, and in particular the cellular baseband processor(s) 1524 and/or the application processor(s) 1506, may include means for receiving, from a network entity, an access control indication that indicates support for at least one of a first mode of operation or a second mode of operation. The apparatus includes means for transmitting, to the network entity, a backscattered signal comprising the first mode of operation. The apparatus includes means for communicating with the network entity in response to the first mode of operation of the backscattered signal actively supported by the access control indication. The apparatus further includes means for switching between the first mode of operation or the second mode of operation based on the access control indication. The apparatus further includes means for trans-mitting, to the network entity, a capability indication that indicates support for at least one of the first mode of operation, the second mode of operation, or the first mode of operation and the second mode of operation. In some aspects, the apparatus 1504 may further include means for performing any of the aspects described in connection with the flowchart in FIG. 13, FIG. 14, and/or any of the aspects performed by the tag in FIGS. 4 and/or 9. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/ processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity comprising providing, to a passive node or a semi-passive node, an access control indication that indicates support for at least one of a first mode of operation or a second mode of operation; monitoring for a backscattered signal from the passive node or the semi-passive node that is supported by the access control indication, wherein the backscattered signal comprises the first mode of operation; and communicating with the passive node or the semi-passive node in response to the first mode of operation of the backscattered signal actively supported by the access control indication.

Aspect 2 is the method of aspect 1, further includes that communication with the passive node or the semi-passive node does not occur in response to the first mode of operation of the backscattered signal not indicated as supported by the access control indication.

Aspect 3 is the method of any of aspects 1 and 2, further includes that a first set of communication resources are utilized for the first mode of operation and a second set of communication resources are utilized for the second mode of operation.

Aspect 4 is the method of any of aspects 1-3, further includes that modes of operation comprise at least a first operation with polarization conversion or a second operation without the polarization conversion.

Aspect 5 is the method of any of aspects 1-4, further includes that the operation with the polarization conversion provides separation between a query signal provided to the passive node or the semi-passive node and the backscattered signal.

Aspect 6 is the method of any of aspects 1-5, further includes that the access control indication indicates the support for passive nodes or semi-passive nodes that operate in the first mode of operation, the second mode of operation, or both the first mode of operation and the second mode of operation.

Aspect 7 is the method of any of aspects 1-6, further including obtaining, from the passive node or the semi-passive node, a capability indication that indicates the support for at least one of the first mode of operation, the second mode of operation, or the first mode of operation and the second mode of operation.

Aspect 8 is the method of any of aspects 1-7, further includes that the backscattered signal indicates a current mode of operation of the passive node or the semi-passive node.

Aspect 9 is an apparatus for wireless communication at a network entity including at least one processor coupled to a memory and at least one transceiver, the at least one processor configured to implement any of aspects 1-8.

Aspect 10 is an apparatus for wireless communication at a network entity including means for implementing any of aspects 1-8.

Aspect 11 is a computer-readable medium storing computer executable code, where the code when executed by a processor causes the processor to implement any of aspects 1-8.

Aspect 12 is a method of wireless communication at a passive or semi-passive node comprising receiving, from a network entity, an access control indication that indicates support for at least one of a first mode of operation or a second mode of operation; transmitting, to the network entity, a backscattered signal comprising the first mode of operation; and communicating with the network entity in response to the first mode of operation of the backscattered signal actively supported by the access control indication.

Aspect 13 is the method of aspect 12, further includes that the backscattered signal indicates a mode of operation of the backscattered signal.

Aspect 14 is the method of any of aspects 12-13, further including switching between the first mode of operation or the second mode of operation based on the access control indication.

Aspect 15 is the method of any of aspects 12-14, further includes that communication with the network entity does not occur in response to the first mode of operation of the backscattered signal not indicated as supported by the access control indication.

Aspect 16 is the method of any of aspects 12-15, further includes that modes of operation comprise at least a first operation with polarization conversion or a second operation without polarization conversion.

Aspect 17 is the method of any of aspects 12-16, further includes that the operation with the polarization conversion provides separation between a query signal provided to the passive or semi-passive node and the backscattered signal.

Aspect 18 is the method of any of aspects 12-17, further includes that the access control indication indicates the support for passive nodes or semi-passive nodes that operate in the first mode of operation, the second mode of operation, or both the first mode of operation and the second mode of operation.

Aspect 19 is the method of any of aspects 12-18, further including transmitting, to the network entity, a capability indication that indicates the support for at least one of the first mode of operation, the second mode of operation, or the first mode of operation and the second mode of operation.

Aspect 20 is the method of any of aspects 12-19, further includes that the backscattered signal indicates a current mode of operation of the passive or semi-passive node.

Aspect 21 is an apparatus for wireless communication at a passive or semi-passive node including at least one processor coupled to a memory and at least one transceiver, the at least one processor configured to implement any of aspects 12-20.

Aspect 22 is an apparatus for wireless communication at a passive or semi-passive node including means for implementing any of aspects 12-20.

Aspect 23 is a computer-readable medium storing computer executable code, where the code when executed by a processor causes the processor to implement any of aspects 12-20.

What is claimed is:

1. An apparatus for wireless communication at a network entity, comprising:

at least one memory; and at least one processor coupled to the at least one memory and, based at least in part on information stored in the at least one memory, the at least one processor is configured to cause the apparatus to:

receive, from a passive node or a semi-passive node, a capability indication that indicates first support for at least one of a first mode of operation with polarization conversion or a second mode of operation without the polarization conversion;

transmit, from the network entity to the passive node or the semi-passive node, an access control indication that indicates second support for at least one of the first mode of operation with the polarization conversion or the second mode of operation without the polarization conversion;

monitor for a backscattered signal from the passive node or the semi-passive node based on the first support indicated in the capability indication and the second support indicated in the access control indication, wherein the backscattered signal comprises the first mode of operation or the second mode of operation; and communicate with the passive node or the semi-passive node in response to a mode of operation of the backscattered signal that is actively supported as indicated by the access control indication and the capability indication received from the passive node or the semi-passive node.

2. The apparatus of claim 1, further comprising a transceiver coupled to the at least one processor, the transceiver being configured to:

transmit, to the passive node or the semi-passive node, the access control indication that indicates the second support for the at least one of the first mode of operation or the second mode of operation; and communicate with the passive node or the semi-passive node in response to the first mode of operation of the backscattered signal actively supported by the access control indication.

3. The apparatus of claim 1, wherein communication with the passive node or the semi-passive node does not occur in response to the first mode of operation of the backscattered signal not indicated as supported by the access control indication.

4. The apparatus of claim 1, wherein a first set of communication resources are utilized for the first mode of operation and a second set of communication resources are utilized for the second mode of operation.

5. The apparatus of claim 1, wherein the operation with the polarization conversion provides separation between a query signal provided to the passive node or the semi-passive node and the backscattered signal.

6. The apparatus of claim 1, wherein the access control indication indicates the second support for passive nodes or semi-passive nodes that operate in the first mode of operation, the second mode of operation, or both the first mode of operation and the second mode of operation.

7. The apparatus of claim 1, wherein the backscattered signal indicates a current mode of operation of the passive node or the semi-passive node.

8. The apparatus of claim 1, wherein an indication of use of the first mode of operation with the polarization conversion or the second mode of operation without the polarization conversion is dynamic.

9. The apparatus of claim 1, wherein an indication of use of the first mode of operation with the polarization conversion or the second mode of operation without the polarization conversion is semi-persistent, semi-static, or periodic.

10. The apparatus of claim 1, wherein an indication of use of the first mode of operation with the polarization conversion or the second mode of operation without the polarization conversion is event-triggered.

11. A method of wireless communication at a network entity, comprising:

receiving, from a passive node or a semi-passive node, a capability indication that indicates first support for at least one of a first mode of operation with polarization conversion or a second mode of operation without the polarization conversion;

transmitting, from the network entity to the passive node or the semi-passive node, an access control indication that indicates second support for at least one of the first mode of operation with the polarization conversion or the second mode of operation without the polarization conversion;

monitoring for a backscattered signal from the passive node or the semi-passive node based on the first support indicated in the capability indication and the second support indicated in the access control indication, wherein the backscattered signal comprises the first mode of operation or the second mode of operation; and communicating with the passive node or the semi-passive node in response to a mode of operation of the backscattered signal that is actively supported as indicated by the access control indication and the capability indication received from the passive node or the semi-passive node.

12. The method of claim 11, wherein communication with the passive node or the semi-passive node does not occur in response to the first mode of operation of the backscattered signal not indicated as supported by the access control indication.

13. The method of claim 11, wherein a first set of communication resources are utilized for the first mode of operation and a second set of communication resources are utilized for the second mode of operation.

14. The method of claim 11, wherein the operation with the polarization conversion provides separation between a query signal provided to the passive node or the semi-passive node and the backscattered signal.

15. The method of claim 11, wherein the access control indication indicates the second support for passive nodes or semi-passive nodes that operate in the first mode of operation, the second mode of operation, or both the first mode of operation and the second mode of operation.

16. An apparatus for wireless communication at a passive or semi-passive node, comprising:
  at least one memory; and
  at least one processor coupled to the at least one memory and, based at least in part on information stored in the at least one memory, the at least one processor is configured to cause the apparatus to:
    transmit, from the passive or semi-passive node, a capability indication that indicates first support for at least one of a first mode of operation with polarization conversion or a second mode of operation without the polarization conversion;
    receive, from a network entity, an access control indication that indicates second support for at least one of the first mode of operation with the polarization conversion or the second mode of operation without the polarization conversion;
    transmit, to the network entity, a backscattered signal comprising the first mode of operation or the second mode of operation based on the first support indicated in the capability indication and the second support indicated in the access control indication; and
    communicate with the network entity in response to a mode of operation of the backscattered signal that is actively supported as indicated by the access control indication and the capability indication.

17. The apparatus of claim 16, further comprising a transceiver coupled to the at least one processor, the transceiver being configured to:
  receive, from the network entity, the access control indication that indicates the second support for the at least one of the first mode of operation or the second mode of operation;
  transmit, to the network entity, the backscattered signal comprising the first mode of operation; and communicate with the network entity in response to the first mode of operation of the backscattered signal actively supported by the access control indication.

18. The apparatus of claim 16, wherein the backscattered signal indicates the mode of operation of the backscattered signal.

19. The apparatus of claim 16, wherein the at least one processor is configured to:
  switch between the first mode of operation with the polarization conversion and the second mode of operation without the polarization conversion based on the access control indication.

20. The apparatus of claim 16, wherein communication with the network entity does not occur in response to the first mode of operation of the backscattered signal not indicated as supported by the access control indication.

21. The apparatus of claim 16, wherein the operation with the polarization conversion provides separation between a query signal provided to the passive or semi-passive node and the backscattered signal.

22. The apparatus of claim 16, wherein the access control indication indicates the second support for passive nodes or semi-passive nodes that operate in the first mode of operation, the second mode of operation, or both the first mode of operation and the second mode of operation.

23. The apparatus of claim 16, wherein the backscattered signal indicates a current mode of operation of the passive or semi-passive node.

24. The apparatus of claim 16, wherein the at least one processor is further configured to:
  receive, from the network entity, an indication of one or more criteria that includes at least one of a link budget, an amount of self-interference, an energy level at the passive or semi-passive node, a horizontal-horizontal channel state, or a vertical-vertical channel state; and
  select between the first mode of operation with the polarization conversion or the second mode of operation without the polarization conversion based on the one or more criteria in the indication received from the network entity.

25. A method of wireless communication at a passive or semi-passive node, comprising:
  transmitting, from the passive or semi-passive node, a capability indication that indicates first support for at least one of a first mode of operation with polarization conversion or a second mode of operation without the polarization conversion;
  receiving, from a network entity, an access control indication that indicates second support for at least one of the first mode of operation with the polarization conversion or the second mode of operation without the polarization conversion;
  transmitting, to the network entity, a backscattered signal comprising the first mode of operation or the second mode of operation based on the first support indicated in the capability indication and the second support indicated in the access control indication; and
  communicating with the network entity in response to a mode of operation of the backscattered signal that is actively supported as indicated by the access control indication and the capability indication.

26. The method of claim 25, wherein the backscattered signal indicates a mode of operation of the backscattered signal.

27. The method of claim 25, further comprising:

switching between the first mode of operation or the second mode of operation based on the access control indication.

28. The method of claim 25, wherein communication with the network entity does not occur in response to the first mode of operation of the backscattered signal not indicated as supported by the access control indication.

29. The method of claim 25, wherein operation with the polarization conversion provides separation between a query signal provided to the passive or semi-passive node and the backscattered signal.

30. The method of claim 25, wherein the access control indication indicates the second support for passive nodes or semi-passive nodes that operate in the first mode of operation, the second mode of operation, or both the first mode of operation and the second mode of operation.

*     *     *     *     *